(12) United States Patent
Matsumura et al.

(10) Patent No.: US 12,471,095 B2
(45) Date of Patent: Nov. 11, 2025

(54) TERMINAL, RADIO COMMUNICATION METHOD, BASE STATION, AND SYSTEM FOR REPETITIVE PUCCH TRANSMISSION

(71) Applicant: NTT DOCOMO, INC., Tokyo (JP)

(72) Inventors: Yuki Matsumura, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 404 days.

(21) Appl. No.: 18/007,381

(22) PCT Filed: Jul. 31, 2020

(86) PCT No.: PCT/JP2020/029585
§ 371 (c)(1),
(2) Date: Jan. 30, 2023

(87) PCT Pub. No.: WO2022/024396
PCT Pub. Date: Feb. 3, 2022

(65) Prior Publication Data
US 2023/0276446 A1    Aug. 31, 2023

(51) Int. Cl.
*H04W 4/00* (2018.01)
*H04L 5/00* (2006.01)
*H04W 16/28* (2009.01)
*H04W 72/21* (2023.01)

(52) U.S. Cl.
CPC .......... *H04W 72/21* (2023.01); *H04L 5/0012* (2013.01); *H04W 16/28* (2013.01)

(58) Field of Classification Search
CPC .................................................. H04W 72/21
See application file for complete search history.

(56) References Cited

U.S. PATENT DOCUMENTS

| 2019/0158205 | A1* | 5/2019 | Sheng | H04L 5/0048 |
| 2019/0281588 | A1* | 9/2019 | Zhang | H04W 52/08 |
| 2020/0205150 | A1 | 6/2020 | Cheng et al. | |
| 2020/0396760 | A1* | 12/2020 | Yi | H04W 72/23 |
| 2022/0167336 | A1* | 5/2022 | Matsumura | H04W 72/21 |

(Continued)

FOREIGN PATENT DOCUMENTS

EP    3909312 B1 *  9/2023    ............ H04W 52/08

OTHER PUBLICATIONS

International Searching Authority, English Translation of the Written Opinion of the International Searching Authority PCT/JP2020/029585, Jan. 19, 2021, pp. 1-4. (Year: 2021).*

(Continued)

*Primary Examiner* — Elisabeth Benoit Magloire
(74) *Attorney, Agent, or Firm* — Osha Bergman Watanabe & Burton LLP

(57) ABSTRACT

A terminal according to one aspect of the present disclosure includes a control section that applies, for one Physical Uplink Control Channel (PUCCH) resource, a plurality of spatial relation information (SRI), and a transmitting section that performs transmission of a plurality of PUCCH transmission occasions in the PUCCH resource by using respective spatial domain transmission filters based on the plurality of spatial relation information. According to one aspect of the present disclosure, it is possible to achieve preferable repetitive PUCCH transmission.

6 Claims, 16 Drawing Sheets

(56) References Cited

U.S. PATENT DOCUMENTS

2022/0173867 A1* 6/2022 Nogami ............... H04L 5/0053
2023/0093264 A1* 3/2023 Gao ..................... H04W 52/16
370/329

OTHER PUBLICATIONS

Office Action issued in Chinese Patent Application No. 202080105675.6, dated Nov. 29, 2024 (25 pages).
Office Action issued in Japanese Application No. 2022-539988, dated Jul. 16, 2024 (8 pages).
3GPP TSG-RAN WG1 #96; R1-1903818; Nokia, Nokia Shanghai Bell; "Summary of Friday offline discussion on UL/DL intra-UE prioritization/multiplexing"; Athens, Greece, Feb. 25-Mar. 1, 2019 (31 pages).
3GPP TSG-RAN WG1 Meeting #101-e; Tdoc R1-2004633; Ericsson; "High Level Views on Rel-17 feMIMO"; eMeeting, May 25-Jun. 5, 2020 (14 pages).
3GPP TSG-RAN2 Meeting #110e; R2-2005841; Ericsson; "eMIMO corrections"; Electronic, Jun. 1-12, 2020 (9 pages).
International Search Report issued in Application No. PCT/JP2020/029585 mailed on Jan. 19, 2021 (6 pages).
Written Opinion issued in Application No. PCT/JP2020/029585 mailed on Jan. 19, 2021 (3 pages).
OPPO, "Discussion on Multi-beam Operation Enhancements", 3GPP TSG RAN WG1 #98bis, R1-1910117, Chongqing, China, Oct. 14-20, 2019 (11 pages).
ZTE Corporation, "Simulation results from multi-slot PUCCH", 3GPP TSG-RAN WG4 Meeting #90bis, R4-1905858, Reno, NV, USA, May 13-17, 2019 (2 pages).
3GPP TS 36.300 V8.12.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)" Mar. 2010 (149 pages).

* cited by examiner

FIG. 1A

| SRI FIELD VALUE | SRI SEQUENCE |
|---|---|
| 000 | FIRST SRI SEQUENCE ACTIVATED BY MAC CE |
| 001 | SECOND SRI SEQUENCE ACTIVATED BY MAC CE |
| 010 | THIRD SRI SEQUENCE ACTIVATED BY MAC CE |
| 011 | FOURTH SRI SEQUENCE ACTIVATED BY MAC CE |
| ⋮ | ⋮ |
| 111 | EIGHTH SRI SEQUENCE ACTIVATED BY MAC CE |

FIG. 1B

| SRI SEQUENCE ID | SRI SEQUENCE |
|---|---|
| 0 | ⋮ |
| 1 | {SRI ID#1, SRI ID#2, SRI ID#3, SRI ID#4} |
| ⋮ | ⋮ |
| 5 | {SRI ID#1, SRI ID#2} |
| ⋮ | ⋮ |
| 8 | {SRI ID#1} |

| SRI SEQUENCE ID | SRI SEQUENCE |
|---|---|
| 0 | {SRI ID#x_1} |
| 1 | {SRI ID#x_2, SRI ID#x_3} |
| 2 | {SRI ID#x_4, SRI ID#x_5} |
| ... | ... |

ONLY ONE SRI CONFIGURABLE WITH HIGHER LAYER

FIG. 2

| PRI FIELD VALUE | PUCCH RESOURCE |
|---|---|
| 000 | PUCCH RESOURCE 1 |
| 001 | PUCCH RESOURCE 2 |
| 010 | PUCCH RESOURCE 3 |
| 011 | PUCCH RESOURCE 4 |
| 100 | PUCCH RESOURCE 5 |
| 101 | PUCCH RESOURCE 6 |
| 110 | PUCCH RESOURCE 7 |
| 111 | PUCCH RESOURCE 8 |

GROUP 1 (PUCCH RESOURCE 1–4) ←---- {SRI ID#1}

GROUP 2 (PUCCH RESOURCE 5–8) ←---- {SRI ID#1, SRI ID#2}

FIG. 3

TERMINAL, RADIO COMMUNICATION METHOD, BASE STATION, AND SYSTEM FOR REPETITIVE PUCCH TRANSMISSION

TECHNICAL FIELD

The present disclosure relates to a terminal, a radio communication method, and a base station in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (for example, also referred to as "5th generation mobile communication system (5G)," "5G+(plus)," "6th generation mobile communication system (6G)," "New Radio (NR)," "3GPP Rel. 15 (or later versions)," and so on) are also under study.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

In Rel-15 NR, spatial relation information (which may be referred to as SRI) related to a Physical Uplink Control Channel (PUCCH) may be configured for a user terminal (User Equipment (UE)). At a certain time, Rel-15 NR performs control so that one PUCCH SRI is active for one PUCCH resource.

For NR, the UE that repetitively transmits a PUCCH for a plurality of transmission/reception points in order to improve reliability of the PUCCH is under study. Repetitive transmission of the PUCCH may be referred to as PUCCH repetition.

However, according to NR specifications thus far, application of different SRI in the PUCCH repetition fails, and effective improvement in quality of reception of the PUCCH fails. For example, this case fails to preferably achieve spatial diversity gain, high rank transmission, and the like in a case where a plurality of transmission/reception points are used, and an increase in communication throughput may be suppressed.

Thus, an object of the present disclosure is to provide a terminal, a radio communication method, and a base station that can achieve preferable repetitive PUCCH transmission.

Solution to Problem

A terminal according to one aspect of the present disclosure includes a control section that applies, for one Physical Uplink Control Channel (PUCCH) resource, a plurality of spatial relation information (SRI), and a transmitting section that performs transmission of a plurality of PUCCH transmission occasions in the PUCCH resource by using respective spatial domain transmission filters based on the plurality of spatial relation information.

Advantageous Effects of Invention

According to one aspect of the present disclosure, it is possible to achieve preferable repetitive PUCCH transmission.

BRIEF DESCRIPTION OF DRAWINGS

FIGS. 1A and 1B are each a diagram to show an example of SRI sequences according to a first embodiment;

FIG. 2 is a diagram to show an example in which the number of spatial relations for a specific SRI sequence is limited;

FIG. 3 is a diagram to show an example of spatial relations corresponding to PUCCH resource groups;

DESCRIPTION OF EMBODIMENTS (Spatial Relation Information)

Figure 4A:
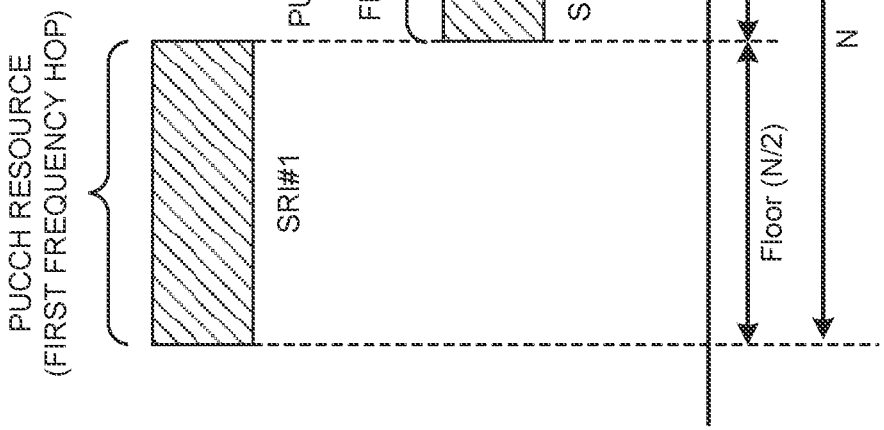
FIGS. 4A and 4B are each a diagram to show an example of mapping of a plurality of SRI for PUCCH transmission according to a second embodiment.

In NR, a UE controls transmission processing (for example, at least one of transmission, mapping, precoding, modulation, and coding) of at least one of a signal and channel (also represented as a signal/channel) in uplink on the basis of a certain spatial relation.

The spatial relation applied to a certain signal/channel may be identified by spatial relation information (SRI) notified (configured) with use of higher layer signaling.

Note that in the present disclosure, the higher layer signaling may be, for example, any one or combinations of Radio Resource Control (RRC) signaling, Medium Access Control (MAC) signaling, broadcast information, and the like.

The MAC signaling may use, for example, a MAC control element (MAC CE), a MAC Protocol Data Unit (PDU), or the like. The broadcast information may be, for example, a master information block (MIB), a system information block (SIB), minimum system information (Remaining Minimum System Information (PMSI)), other system information (OSI), or the like.

For example, in Rel-15 NR, spatial relation information ("PUCCH-SpatialRelationInfo" information element of RRC) between a certain reference signal (RS) and an uplink control channel (Physical Uplink Control Channel (PUCCH)) may be included in PUCCH configuration information ("PUCCH-Config" information element of RRC) and configured for the UE.

The certain RS may be at least one of a synchronization signal block (SSB), a channel state information reference signal (CSI-RS), and a reference signal for measurement (Sounding Reference Signal (SRS)).

The configured SRI may include an SRI Identifier (ID) for SRI identification. The SRI may include at least one of an SSB index, a CSI-RS resource ID, and an SRS resource ID as an index of the above-described certain RS. These spatial relation information may include a serving cell index, a bandwidth part (BWP) ID, and the like corresponding to the above-described certain RS.

Note that in the present disclosure, an index, an ID, an indicator, a resource ID, and the like may be interchangeably interpreted.

When spatial relation information related to an SSB or CSI-RS and a PUCCH is configured, the UE may transmit the PUCCH by using a same spatial domain filter as a spatial domain filter for reception of the SSB or CSI-RS. In other words, in this case, the UE may assume that a UE receive beam for the SSB or CSI-RS and a UE transmit beam for the PUCCH are the same.

When spatial relation information related to an SRS and a PUCCH is configured, the UE may transmit the PUCCH by using a same spatial domain filter as a spatial domain filter for transmission of the SRS. In other words, in this case, the UE may assume that a UE transmit beam for the SRS and a UE transmit beam for the PUCCH are the same.

Note that a spatial domain filter for transmission by a base station, a downlink spatial domain transmission filter, and a transmit beam of the base station may be interchangeably interpreted. A spatial domain filter for reception by the base station, an uplink spatial domain receive filter, and a receive beam of the base station may be interchangeably interpreted.

A spatial domain filter for transmission by the UE, an uplink spatial domain transmission filter, and a transmit beam of the UE may be interchangeably interpreted. A spatial domain filter for reception by the UE, a downlink spatial domain receive filter, and a receive beam of the UE may be interchangeably interpreted.

The SRI may be configured for the UE in units of PUCCH configurations (PUCCH-Config). The SRI configured by a PUCCH configuration may be applied to all PUCCH resources configured by the PUCCH configuration.

When more than one SRI related to the PUCCH is configured, the UE may perform, on the basis of a PUCCH spatial relation activation/deactivation MAC CE, control so that one PUCCH SRI is active for one PUCCH resource at a certain time.

(Multi-TRP)

For NR, the UE that performs UL transmission (for example, PUCCH transmission) to one or a plurality of transmission/reception points (TRPs) (multiple TRPs (Multi-TRP (M-TRP))) is under study.

As an example, repetitive transmission of a PUCCH with application of different SRI to the multiple TRPs is under study in order to improve reliability of the PUCCH for a use case (or service) with ultra-reliability and low latency (for example, Ultra Reliable and Low Latency Communications (URLLC)). Repetitive transmission of the PUCCH may be referred to as PUCCH repetition. The repetitive transmission may be simply referred to as repetition.

Note that the SRI may correspond to a beam. For example, the UE may assume that the PUCCH with the different SRI is transmitted with use of different beams.

According to the repetitive transmission of the PUCCH, with respect to the PUCCH, improvement in quality of reception on the network side can be expected. However, existing Rel-15/16 NR allows only application of the same spatial relation to repetitive PUCCH transmission.

Thus, according to NR specifications thus far, application of different SRI in the PUCCH repetition fails, and effective improvement in quality of reception of the PUCCH is not achieved. This case fails to preferably achieve spatial diversity gain, high rank transmission, and the like in a case where multiple TRPs are used, and an increase in communication throughput may be suppressed.

Thus, the inventors of the present invention came up with the idea of a method for achieving preferable repetitive PUCCH transmission. According to one aspect of the present disclosure, for example, the UE can appropriately determine the number of repetitions in PUCCH repetition using different spatial relations.

Embodiments according to the present disclosure will be described in detail with reference to the drawings as follows. The radio communication methods according to respective embodiments may each be employed individually, or may be employed in combination.

Note that in the present disclosure, "A/B" may mean "at least one of A and B."

Note that in the present disclosure, activation, deactivation, indication (or specification (indicate)), selection, configuration (configure), update, determination (determine), and the like may be interchangeably interpreted. In the present disclosure, a sequence, a list, a set, a group, a cluster, a subset, and the like may be interchangeably interpreted.

In the present disclosure, a panel, a beam, a panel group, a beam group, an Uplink (UL) transmission entity, a TRP, spatial relation information (SRI), a spatial relation, a control resource set (COntrol REsource SET (CORESET)), a Physical Downlink Shared Channel (PDSCH), a codeword, a base station, a certain antenna port (for example, a demodulation reference signal (DMRS) port), a certain antenna port group (for example, a DMRS port group), a certain group (for example, a code division multiplexing (CDM) group, a certain reference signal group, or a CORESET group), a certain resource (for example, a certain reference signal resource), a certain resource set (for example, a certain reference signal resource set), a CORESET pool, a PUCCH group (PUCCH resource group), a spatial relation group, a downlink TCI state (DL TCI state), an uplink TCI state (UL TCI state), an unified TCI state, and the like may be interchangeably interpreted.

Note that with respect to single-DCI, an i-th TRP (TRP #i) may mean an i-th TCI state, an i-th CDM group, or the like (i is an integer).

Note that with respect to multi-DCI, an i-th TRP (TRP #i) may mean a CORESET corresponding to CORESET pool index=i, an i-th TCI state, an i-th CDM group, or the like (i is an integer).

The panel may relate to at least one of a group index of an SSB/CSI-RS group, a group index of a group-based beam report, and a group index of an SSB/CSI-RS group for group-based beam reporting.

A panel Identifier (ID) and a panel may be interchangeably interpreted. In other words, a TRP ID and a TRP, a CORESET group ID and a CORESET group, and the like may each be interchangeably interpreted.

In the present disclosure, an index, an ID, an indicator, and a resource ID may be interchangeably interpreted. In the present disclosure, a list, a group, a cluster, a subset, and the like may be interchangeably interpreted.

In the present disclosure, simple description "spatial relation" and a spatial relation for a PUCCH may be interchangeably interpreted.

PUCCH repetition of the present disclosure and each of MTRP-based repetition, repetition in Rel. 17, repetition with application of different spatial relations, and the like may be interchangeably interpreted. The PUCCH will be described in an example below as a PUCCH used for Hybrid Automatic Repeat reQuest ACKnowledgement (HARQ-ACK) transmission in response to a PDSCH, but may be a PUCCH for UCI transmission of at least one of HARQ-ACK, an SR, CSI (for example, aperiodic CSI), and the like, and may be interpreted as such a PUCCH.

A plurality of spatial relations (SRI) in the present disclosure, an SRI sequence, an SRI set, an SRI pattern, SRI applied to PUCCH repetition, and the like may be interchangeably interpreted.

(Radio Communication Method)

First Embodiment

In a first embodiment, a UE may determine the number of PUCCH repetitions on the basis of the number of configured/activated/specified spatial relations (for example, the number of SRI included in an SRI sequence).

SRI applied to PUCCH repetition may be configured for the UE by RRC signaling in the form of an SRI sequence across the PUCCH repetition.

Note that in the present disclosure, the SRI and each of spatial relation information (SRI), an RRC parameter "Spatialrelationinfo," an SRI ID, and the like for a PUCCH may be interchangeably interpreted. In the present disclosure, the SRI sequence and each of an SRI sequence, an SRI set, an SRI pattern, and the like applied to PUCCH repetition may be interchangeably interpreted.

A certain number (for example, M) of SRI sequences may be configured for the UE by RRC signaling. Here, the certain number M may be, for example, 8, 64, or the like, or may be greater than 64.

When a plurality of SRI sequences are configured, one or a plurality of SRI sequences (subsets of SRI sequences) may be additionally activated for the UE with use of a MAC CE. A maximum number of active SRI sequences may be limited to a certain number (for example, 8).

One sequence out of the activated SRI sequences may be specified on the basis of DCI. For example, the UE may determine, on the basis of a specific field of DCI and a specific parameter (or information) related to the DCI, one sequence out of the activated SRI sequences as a sequence used for the PUCCH repetition.

Here, the specific field may be a PUCCH resource indicator (PRI) field, an SRI field, a transmission configuration indication (TCI) field, another field, or the like, or may be represented by a combination of a plurality of fields.

The PRI field is included in DCI to schedule a PDSCH, and corresponds to information to specify a PUCCH resource for transmission of HARQ-ACK corresponding to the PDSCH.

The SRI field may be a field to specify a spatial relation for a PUCCH. The SRI field may be included in the DCI when presence (inclusion) of the SRI field in the DCI is configured by higher layer signaling.

The TCI field may be a field indicating a TCI state for a PDSCH to be scheduled, or may be a UL TCI field indicating a UL TCI state used for PUCCH transmission.

Another field described above may be, for example, a field for controlling the PUCCH (for example, a field referred to as a PUCCH control field). The PUCCH control field may be included in the DCI when presence (inclusion) of the PUCCH control field in the DCI is configured by higher layer signaling.

The above-described specific parameter may include at least one of a time resource, a frequency resource, a control channel element (CCE) index, a physical resource block (PRB) index, a resource element (RE) index, a search space index, a control resource set (CORESET) index, a CORESET pool index, and an aggregation level of (detected) DCI (or corresponding to the DCI or used for reception). In other words, the above-described specific parameter corresponds to implicit notification using the DCI.

FIGS. 1A and 1B are each a diagram to show an example of SRI sequences according to the first embodiment. FIG. 1A shows values of the SRI field included in the DCI and corresponding SRI sequences. The SRI field has 3 bits in the present example, but the number of bits is not limited to this.

The present disclosure describes using, as an example, a case where an SRI sequence is specified by the SRI field as follows, but is not limited to this. Specification of an SRI sequence based on the SRI field in description below may be interpreted as specification of an SRI sequence based on at least one of the above-mentioned specific field and specific parameter. In the present disclosure, the fields listed as the above-mentioned specific field may be interchangeably interpreted.

In FIG. 1A, different SRI sequences (first to eighth SRI sequences) are specified depending on the values of the SRI field. The UE may assume that SRI sequence IDs activated by a MAC CE correspond to respective values of the SRI field in ascending order or in descending order. In other words, when a plurality of activated SRI sequence IDs and SRI field values are sorted in ascending order or in descending order, the UE may assume one-to-one correspondence from lowest to highest.

FIG. 1B is a diagram to show correspondence between SRI sequence IDs and corresponding SRI sequences (SRI sets). The correspondence may be configured/activated by higher layer signaling.

In the present example, SRI sequence ID=1, SRI sequence ID=5, and SRI sequence ID=8 correspond to {#1, #2, #3, #4}, {#1, #2}, and {#1}, respectively. Note that in the present disclosure, for simplicity, SRI ID #x is represented as SRI #x, or is also simply represented as #x.

As mentioned above, the SRI sequence may indicate SRI applied to each repetition in the PUCCH repetition. For example, in a case where an i-th SRI sequence of FIG. 1A corresponds to SRI sequence ID=i+1 of FIG. 1B, the UE for which SRI field=000 is specified may assume that the number of PUCCH repetitions is 4, and may transmit the first, second, third, and fourth PUCCH in the PUCCH repetitions by applying SRI #1, #2, #3, and #4, respectively.

The UE for which SRI field=100 is specified may assume that the number of PUCCH repetitions is 2, and may transmit the first and second PUCCH in the PUCCH repetitions by applying SRI #1 and #2, respectively.

The UE for which SRI field=111 is specified may assume that the number of PUCCH repetitions is 1 (PUCCH transmission without repetition is specified), and may transmit the PUCCH by applying SRI #1.

Note that in the present disclosure, repetitive PUCCH transmission using different spatial relations and repetitive PUCCH transmission using precoder cycling may be interchangeably interpreted.

According to the first embodiment described above, it is possible to appropriately judge the number of repetitions to perform repetitive PUCCH transmission.

Variation of First Embodiment

The number of (configurable) spatial relations associated with values of some SRI fields (or SRI sequence ID values) may be limited more as compared to that of values of another SRI field (or SRI sequence ID values).

For example, the number of spatial relations associated with the values of some SRI fields (or SRI sequence ID values) may be necessarily limited to a specific value (for example, 1 or 2) (without specific limitation to another SRI field values (or SRI values)). When specification of PUCCH transmission without repetition is requested, it is only necessary that an SRI field/SRI sequence ID value with the number of spatial relations limited to 1 is specified for the UE. Thus, limitation to the number of spatial relations is provided, thereby allowing an increase in signaling overhead for SRI/SRI sequence configuration to be preferably suppressed.

FIG. 2 is a diagram to show an example in which the number of spatial relations for a specific SRI sequence is limited. In the present example, the number of spatial relations associated with SRI sequence ID=0 is limited to 1. SRI corresponding to SRI ID #x_1 may be determined by specifications beforehand, may be configured for the UE by higher layer signaling, or may be judged on the basis of UE capability.

Variation 2 of First Embodiment

For Rel-16 (or later versions of) NR, introduction of PUCCH resource groups and control of specification/update of a plurality of spatial relations for each group are under study.

FIG. 3 is a diagram to show an example of spatial relations corresponding to the PUCCH resource groups. In the present example, values of PRIs=0 to 7 correspond to PUCCH resources 1 to 8, respectively, and PUCCH resources 1 to 4 and PUCCH resources 5 to 8 correspond to group 1 and group 2, respectively.

Here, assume that higher layer signaling (for example, RRC or a MAC CE) configures one spatial relation (SRI #1) for group 1 and configures two spatial relations (SRI #1, SRI #2) for group 2.

As mentioned in the first embodiment, the UE may determine the number of PUCCH repetitions on the basis of the number of configured/activated/specified spatial relations. In the example of FIG. 3, when a PUCCH resource belonging to group 1 is specified by the PRI, the UE may perform PUCCH transmission with the number of repetitions, the number being 1 (without repetition), and when a PUCCH resource belonging to group 2 is specified by the PRI, the UE may perform PUCCH transmission with the number of repetitions, the number being 2.

Second Embodiment

In a second embodiment, a UE transmits UCI in one PUCCH resource in 1 slot by using a plurality of SRI. The plurality of SRI may be given in such a manner as mentioned above in the first embodiment.

Figure 4B:
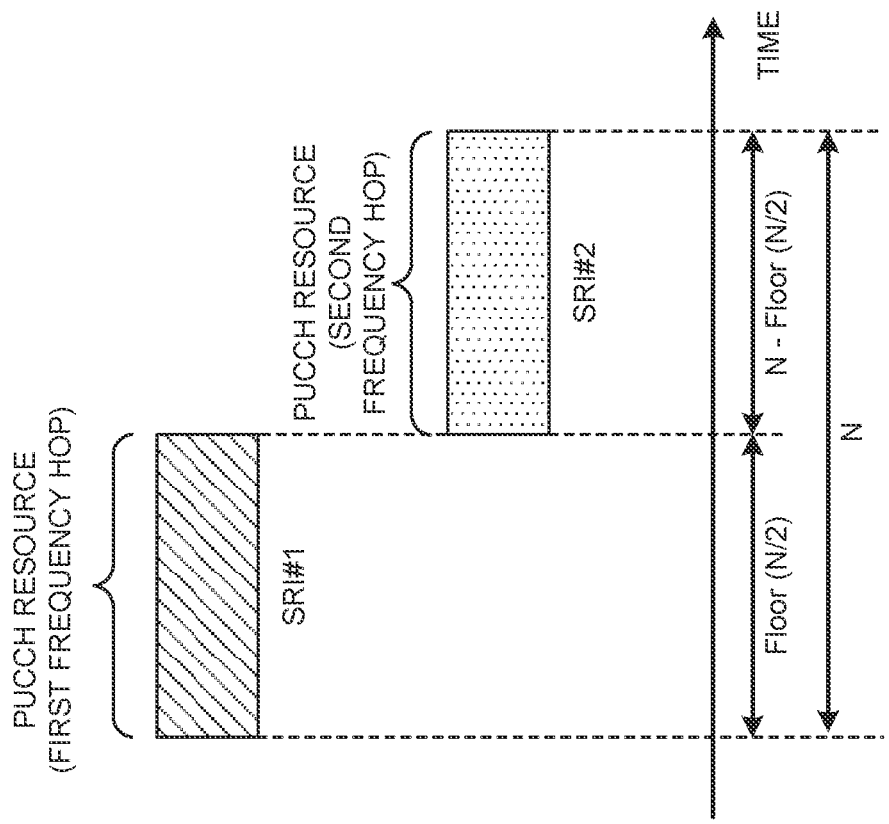

FIGS. 4A and 4B are each a diagram to show an example of mapping of the plurality of SRI for PUCCH transmission according to the second embodiment. The present example illustrates one PUCCH resource using N symbols in 1 slot. Intra-frequency hopping is applied to this PUCCH resource, and a first frequency hop and a second frequency hop have time lengths of Floor (N/2) symbols and N-Floor (N/2) symbols, respectively. Note that Floor (X) is a value obtained by applying a floor function to X.

Consider that it is determined that the plurality of SRI (SRI #1 and SRI #2) are used for this PUCCH transmission. FIG. 4A shows an example in which the SRI are mapped in units of respective hops of intra-frequency hopping. In this case, a symbol boundary of SRI #1 and SRI #2 is a frequency hopping boundary, and can be determined uniquely.

For example, the UE may allocate first SRI to one of the first and second frequency hops, and may allocate second SRI to the other of these.

FIG. 4B shows an example in which the SRI is mapped in units of symbols of the PUCCH resource. In the present example, the UE applies SRI #1 to symbols corresponding to the number of symbols being greater than Floor (N/2) when counted from a start symbol, out of N symbols, and applies SRI #2 to symbols after these symbols. This case means that the UE allocates the first SRI and the second SRI to both the first and second frequency hops (across a plurality of frequency hops) and the second frequency hop, respectively. Note that contrary to this, the number of symbols for SRI #1 may be less than the number of symbols for SRI #2.

For example, a position of the symbol boundary of SRI #1 and SRI #2 may be notified to the UE by higher layer signaling, physical layer signaling, or a combination of these. A bitmap indicating which of SRI #1 or SRI #2 is applied to each symbol may be notified to the UE by higher layer signaling, physical layer signaling, or a combination of these.

Here, the units of the symbols may be interpreted as units of symbol sets (for example, units of two symbols) in consideration of a trade-off between flexibility and notification overhead.

The mapping in FIG. 4B can perform more flexible SRI allocation than the mapping in FIG. 4A. For example, the mapping may be performed so that a time length of a more favorable beam (SRI) is greater.

For example, the UE may allocate the first SRI to a PUCCH transmission occasion with a smaller start symbol number, and may allocate the second SRI to a PUCCH transmission occasion with a larger start symbol number. Note that in the present disclosure, the PUCCH transmission occasions may mean PUCCHs to which the same SRI is applied (or resources for the PUCCHs or time resources for the PUCCHs).

{TPC}

Transmit power control (TPC)-related parameters for each PUCCH transmission occasion (for example, a TPC command, α, P0, and a pathloss reference signal (PL-RS)) will be described.

With respect to α, P0, and PL-RS configured by higher layer signaling, when α, P0, and PL-RS are configured together with/in relation to/in correspondence with spatial relations (SRI), the parameter for each PUCCH transmission occasion is allocated appropriately even when different SRI are applied for each PUCCH transmission occasion.

DCI (for example, DCI format 1_1) (which may be referred to as DL assignment DCI) to schedule a PDSCH may include a TPC command field for each PUCCH transmission occasion (in other words, for the number of SRI). According to this structure, TPC for a PUCCH transmission occasion corresponding to each SRI can be controlled appropriately.

The above-described DCI may include one TPC command field indicating a TPC command for each PUCCH transmission occasion. According to this structure, an increase in a DCI size can be suppressed.

The UE may equally apply one specified TPC command to each PUCCH transmission occasion.

The UE may apply one specified TPC command to a specific PUCCH transmission occasion (for example, the first PUCCH transmission occasion), and may perform control by assuming that a TPC command is not notified for another PUCCH transmission occasion (TPC-based correction value=0 or closed-loop power control is not applied).

The UE may interpret that the TPC command field of the above-described DCI indicates a TPC command field for each PUCCH transmission occasion. For example, when the TPC command field has 2 bits, the UE may judge that the first half of the bits (in the present example, 1 bit) indicates a TPC command field for a PUCCH transmission occasion corresponding to the first SRI, and the second half of the bits (in the present example, 1 bit) indicates a TPC command field for a PUCCH transmission occasion corresponding to the second SRI. Note that the first half of the bits and the second half of the bits may not have the same number of bits, and may have different numbers of bits.

This 1 bit may correspond to, for example, TPC command correction value +1 or −1. A value of this correction value may be determined by specifications beforehand, or may be configured by higher layer signaling. As a value of this correction value, a value for each PUCCH transmission occasion may be configured/defined, or a value common to all PUCCH transmission occasions may be configured/defined.

Note that the UE may judge that a bit sequence obtained by adding a specific bit (for example, '0' or '1') or bit sequence to the head or end of the above-described first half of the bits indicates the TPC command field for the PUCCH transmission occasion corresponding to the first SRI. The UE may judge that a bit sequence obtained by adding a specific bit (for example, '0' or '1') or bit sequence to the head or end of the above-described second half of the bits indicates the TPC command field for the PUCCH transmission occasion corresponding to the second SRI.

The UE may determine a TPC command correction value for each PUCCH transmission occasion on the basis of correspondence between a value of one specified TPC command field and a TPC command correction value for each PUCCH transmission occasion. The correspondence may be defined by specifications beforehand, may be configured for the UE by higher layer signaling, may be specified by DCI, or may be judged on the basis of UE capability. According to this structure, it is possible to moderately and flexibly indicate a TPC command for each PUCCH transmission occasion while suppressing an increase in a DCI size.

{Phase Continuity}

Existing Rel-15/16 NR specifications define that when intra-slot intra-frequency hopping is enabled by a higher layer parameter for a PUCCH, a channel in which a symbol of an antenna port used for uplink transmission is communicated may be estimated on the basis of a channel in which another symbol of the same antenna port is communicated, and note, however, that the estimation is limited to a case where these two symbols correspond to the same frequency hop (note that the estimation is applied regardless of whether a distance of this frequency hop is zero).

In other words, in existing specifications, a phase in the same frequency hop of the same slot is continuous (a channel estimation result in continuous symbols is available).

In the second embodiment, the following requirement may be introduced:

When intra-slot intra-frequency hopping is enabled by a higher layer parameter for a PUCCH, a channel in which a symbol of an antenna port used for uplink transmission is communicated may be estimated on the basis of a channel in which another symbol of the same antenna port is communicated, and note, however, that the estimation is limited to a case where these two symbols correspond to the same SRI (note that the estimation is applied regardless of whether these two symbols correspond to the same frequency hop).

In the second embodiment, when a plurality of SRI are allocated to one PUCCH resource, it may be assumed that a phase in a PUCCH transmission occasion corresponding to one SRI is continuous (2 arbitrary symbols in this PUCCH transmission occasion can mutually use a channel estimation result). According to this structure, when the same SRI is applied in such PUCCH transmission occasions across different frequency hops in the same slot as described in FIG. 4B, a channel estimation result in symbols in the PUCCH transmission occasions can be used preferably.

According to the second embodiment described above, it is possible to appropriately perform, on the basis of single-DCI, repetitive transmission with application of different SRI.

Third Embodiment

In a third embodiment, a UE transmits UCI in a plurality of PUCCH resources in 1 slot by using a plurality of SRI. The plurality of SRI may be given in such a manner as mentioned above in the first embodiment.

The UCI may be encoded in the respective PUCCH resources. In other words, the same UCI may be transmitted on each of the above-described plurality of PUCCHs. This operation may be referred to as UCI repetition. In a case of the UCI repetition, if a base station can receive one PUCCH resource, the base station can decode the UCI.

The UCI may be encoded across the above-described plurality of PUCCH resources. In other words, one UCI may be transmitted by being divided among the above-described plurality of PUCCH resources. This operation may be referred to as UCI encoding across multiple PUCCH resources. In a case of the UCI encoding across multiple PUCCH resources, it is preferable that the base station receives both PUCCH resources for decoding. If the base station can receive both the PUCCH resources at a certain quality level or higher, improvement in characteristics can be expected.

Figure 5:
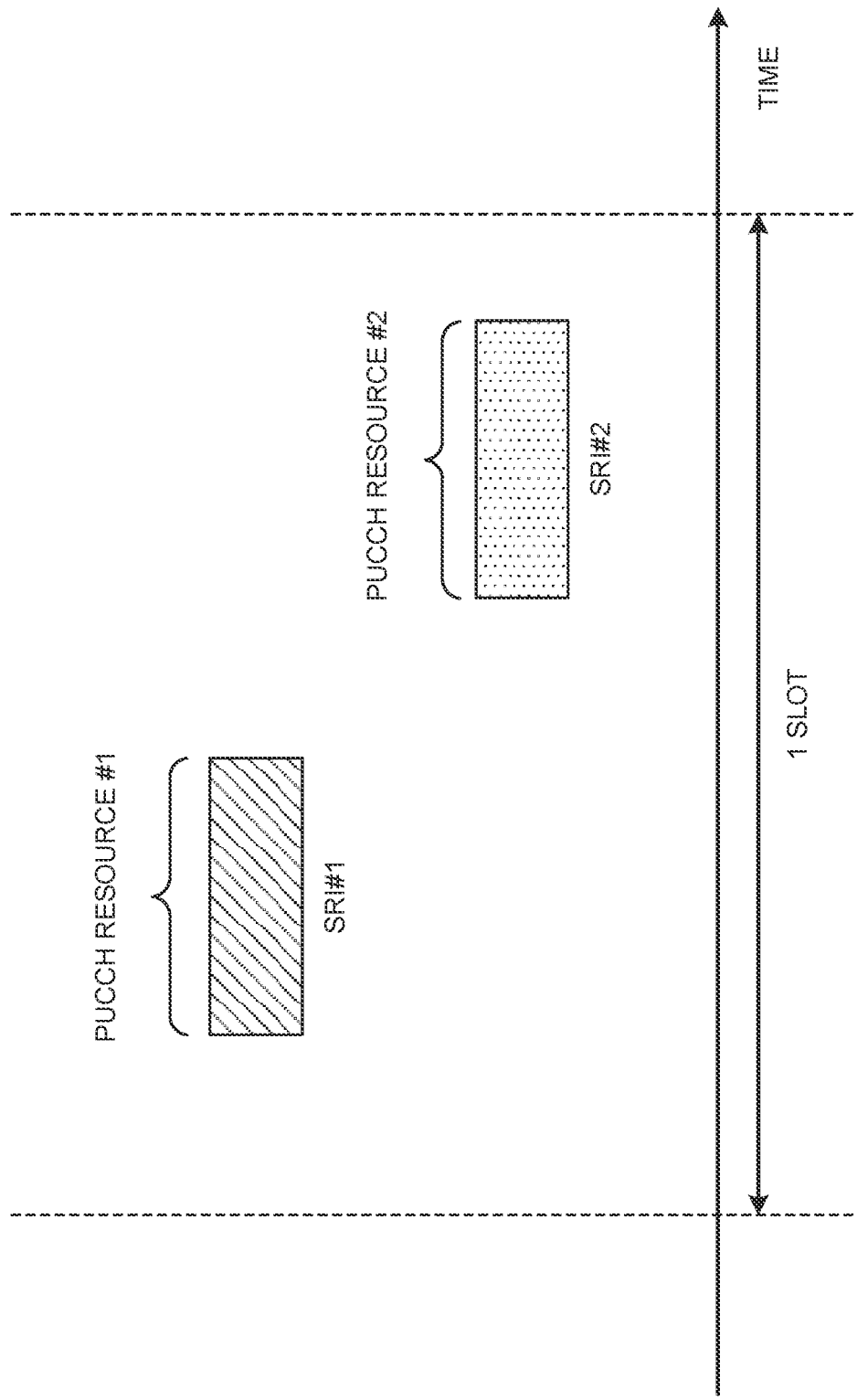
FIG. 5 is a diagram to show an example of mapping of a plurality of SRI for PUCCH transmission according to a third embodiment.

FIG. 5 is a diagram to show an example of mapping of the plurality of SRI for PUCCH transmission according to the third embodiment. The present example illustrates two PUCCH resources (PUCCH resource #1 and PUCCH resource #2) in 1 slot. For simplicity, intra-frequency hopping is not applied to each PUCCH resource, but may be applied to each PUCCH resource. The UE may apply different SRI (SRI #1 and SRI #2) to PUCCH resource #1 and PUCCH resource #2, respectively.

Note that for a combination of formats for two PUCCHs transmitted by applying different SRI in a slot, it may be assumed that a constraint is absent, or may be assumed that at least one of the following constraints is present:
  Combination of short PUCCH format and short PUCCH format with relatively short time lengths is prohibited (is not expected) or allowed;
  Combination of short PUCCH format and long PUCCH format with relatively long time length is prohibited (is not expected) or allowed; and
  Combination of long PUCCH format and long PUCCH format is prohibited (is not expected) or allowed.

Note that the short PUCCH format may be, for example, PUCCH format 0 or PUCCH format 2 having a time length of 1 or 2 symbols. Note that the long PUCCH format may be, for example, PUCCH format 1, PUCCH format 3, or PUCCH format 4 having a time length of 4 symbols or more. Definitions of these formats are not limited to these, and it is only necessary that the long PUCCH format has a longer time length than that of the short PUCCH format.

A case (embodiment 3.1) where two PUCCHs transmitted by applying different SRI in a slot are triggered by using one DCI (single-DCI) and a case (embodiment 3.2) where the two PUCCHs are triggered by using respective separate DCI (multi-DCI) will be described as follows.

Embodiment 3.1

In embodiment 3.1, a TPC-related parameter for each PUCCH transmission occasion (in the third embodiment, a PUCCH transmission occasion corresponds to a PUCCH resource) may be configured/specified in a manner similar to that described in the first embodiment.

A PRI field in embodiment 3.1 will be described below.

DCI (for example, DCI format 1_1) (which may be referred to as DL assignment DCI) to schedule a PDSCH may include a PRI field for each PUCCH transmission occasion (in other words, for the number of SRI). According to this structure, a PUCCH resource for a PUCCH transmission occasion corresponding to each SRI can be controlled appropriately.

The above-described DCI may include one PRI field indicating a PUCCH resource for each PUCCH transmission occasion. According to this structure, an increase in a DCI size can be suppressed.

The UE may determine a PUCCH resource for a specific PUCCH transmission occasion (for example, the first PUCCH transmission occasion) on the basis of one specified PRI field, and may determine a PUCCH resource for another PUCCH transmission occasion on the basis of a specific rule.

The UE may determine that the PUCCH resource for the another PUCCH transmission occasion is located in a position obtained by adding certain time/frequency offset to a position of the PUCCH resource for the first PUCCH transmission occasion. The certain time/frequency offset may be determined by specifications beforehand, may be configured for the UE by higher layer signaling, or may be judged on the basis of UE capability.

The UE may determine that the PUCCH resource for the another PUCCH transmission occasion is a PUCCH resource corresponding to a value obtained by adding or subtracting offset from a value of the above-described one specified PRI field (or remainder obtained by dividing the value by the number of available values of the PRI field). For example, when the offset is '2' and the value of the one specified PRI field is '1,' the UE may determine the PUCCH resource by judging that PRI field value=3 (=1+2) has been notified for the another PUCCH transmission occasion. The offset may be determined by specifications beforehand, may be configured for the UE by higher layer signaling, or may be judged on the basis of UE capability.

The UE may interpret the PRI field of the above-described DCI as a PRI field indicating a PRI field for each PUCCH transmission occasion. For example, when the PRI field has 2 bits, the UE may judge that the first half of the bits (in the present example, 1 bit) indicates a PRI field for a PUCCH transmission occasion corresponding to the first SRI, and the second half of the bits (in the present example, 1 bit) indicates a PRI field for a PUCCH transmission occasion corresponding to the second SRI. Note that the first half of the bits and the second half of the bits may not have the same number of bits, and may have different numbers of bits.

Correspondence between this value of the first half of the bits or the second half of the bits and a PUCCH resource may be determined by specifications beforehand, or may be configured by higher layer signaling. This correspondence may be configured/defined for each PUCCH transmission occasion, or may be configured/defined in common with all PUCCH transmission occasions.

Note that the UE may judge that a bit sequence obtained by adding a specific bit (for example, '0' or '1') or bit sequence to the head or end of the above-described first half of the bits indicates the PRI field for the PUCCH transmission occasion corresponding to the first SRI. The UE may judge that a bit sequence obtained by adding a specific bit (for example, '0' or '1) or bit sequence to the head or end of the above-described second half of the bits indicates the PRI field for the PUCCH transmission occasion corresponding to the second SRI.

The UE may determine a PUCCH resource for each PUCCH transmission occasion on the basis of correspondence between a value of one specified PRI field and a PUCCH resource (or PRI value) for each PUCCH transmission occasion. The correspondence may be defined by specifications beforehand, may be configured for the UE by higher layer signaling, may be specified by DCI, or may be judged on the basis of UE capability. According to this structure, it is possible to moderately and flexibly indicate a PUCCH resource for each PUCCH transmission occasion while suppressing an increase in a DCI size.

Note that a PUCCH resource set common to PUCCH transmission occasions may be configured for the UE by a higher layer, or a PUCCH resource set for each PUCCH transmission occasion may be configured for the UE by the higher layer. The UE may determine a PUCCH resource for each PUCCH transmission occasion on the basis of at least one of such a PRI field for each PUCCH transmission occasion and one PRI field common to PUCCH transmission occasions mentioned above. PUCCH resource sets referred for determination of the PUCCH resource may be used for each PUCCH transmission occasion in order (by being switched to each other), or may be determined on the basis of a CORESET pool index of a CORESET in which the DCI has been detected.

Figure 6:
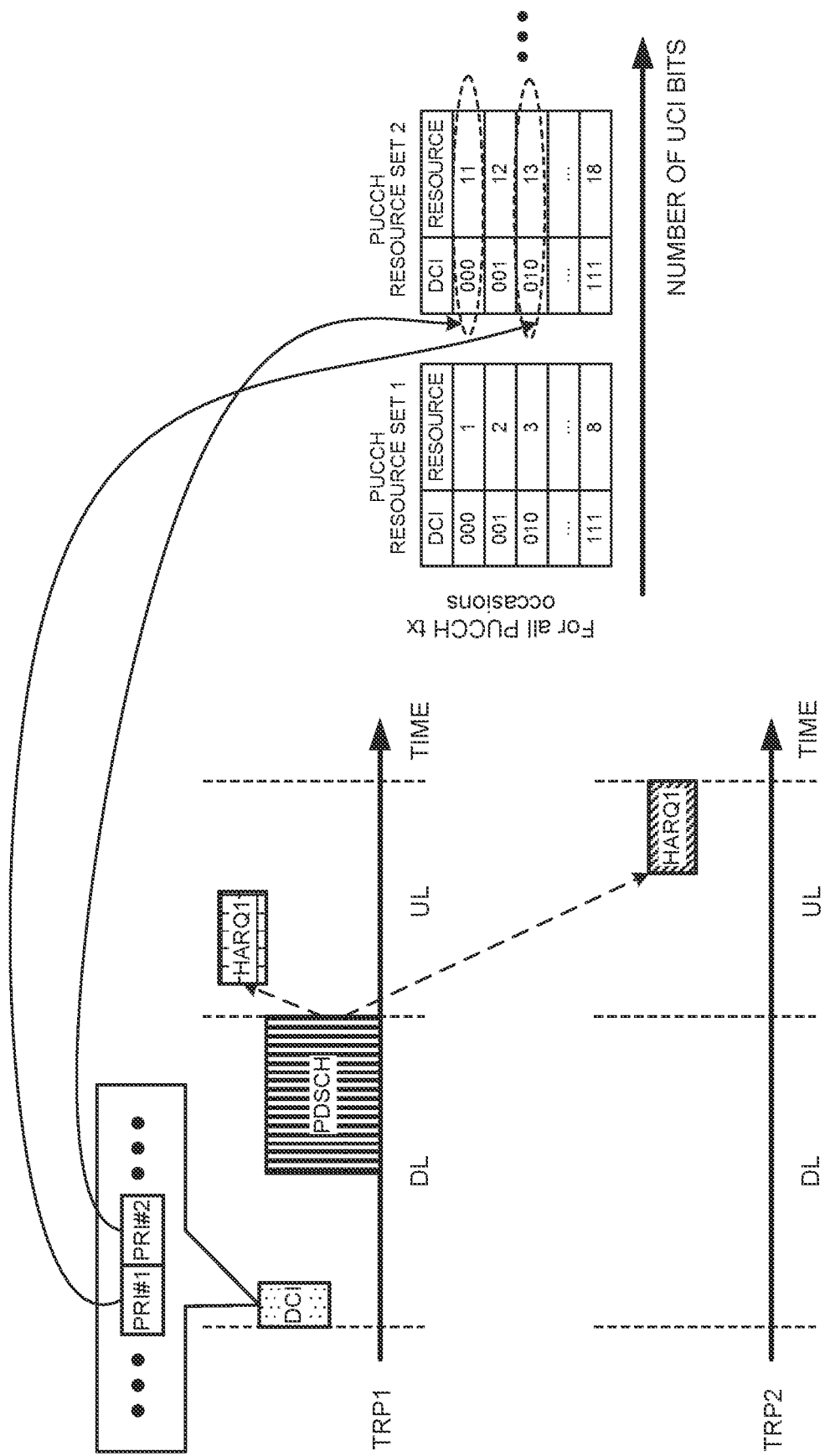
FIG. 6 is a diagram to show an example in which a PUCCH resource set group common to PUCCH transmission occasions is configured in embodiment 3.1.

FIG. 6 is a diagram to show an example in which a PUCCH resource set group common to PUCCH transmission occasions is configured in embodiment 3.1. In the present example, the PUCCH resource set group constituted by PUCCH resource sets 1, 2, . . . , is configured for the UE in common with PUCCH transmission occasions (without distinguishing between the PUCCH transmission occasions). Note that TRP 1 and TRP 2 in the diagram are just conceptual examples, and these may be the same TRP.

Note that in the present disclosure, PUCCH resource set i may be defined such that the larger a UCI bit size, the greater i is used for PUCCH resource set i, but is not limited to this. An example in which the number of PUCCH resources included in one PUCCH resource set is 8 is shown, but is not limited to this.

An example below shows an example in which HARQ-ACK transmission is transmitted by using a PUCCH resource of PUCCH resource set 2 (in other words, PUCCH resource set 2 has been selected on the basis of a UCI size), but is not limited to this.

As shown in the right side of FIG. 6, in PUCCH resource set 1, PUCCH resources 1 to 8 corresponding to DCI (PRI field (PRI #1 field or PRI #2 field), the same applies to the drawings below)=000 to 111 are configured. In PUCCH resource set 2, PUCCH resources 11 to 18 corresponding to DCI=000 to 111 are configured.

As shown in the upper left side of FIG. 6, the UE receives DCI 1 to indicate a PDSCH of TRP 1, and transmits HARQ 1 (HARQ-ACK) corresponding to the PDSCH. Here, a PUCCH resource for HARQ 1 may be specified by PRI #1 field and PRI #2 field of DCI 1. FIG. 6 shows an example in which PRI #1 field and PRI #2 field of DCI 1 are 010 and 000, respectively, a PUCCH resource for a first PUCCH transmission occasion (to which SRI for TRP 1 is applied) of the UE is resource 13 based on a table on the right side of FIG. 6, and a PUCCH resource for a second PUCCH transmission occasion (to which SRI for TRP 2 is applied) of the UE is resource 11 based on the table.

Figure 7:
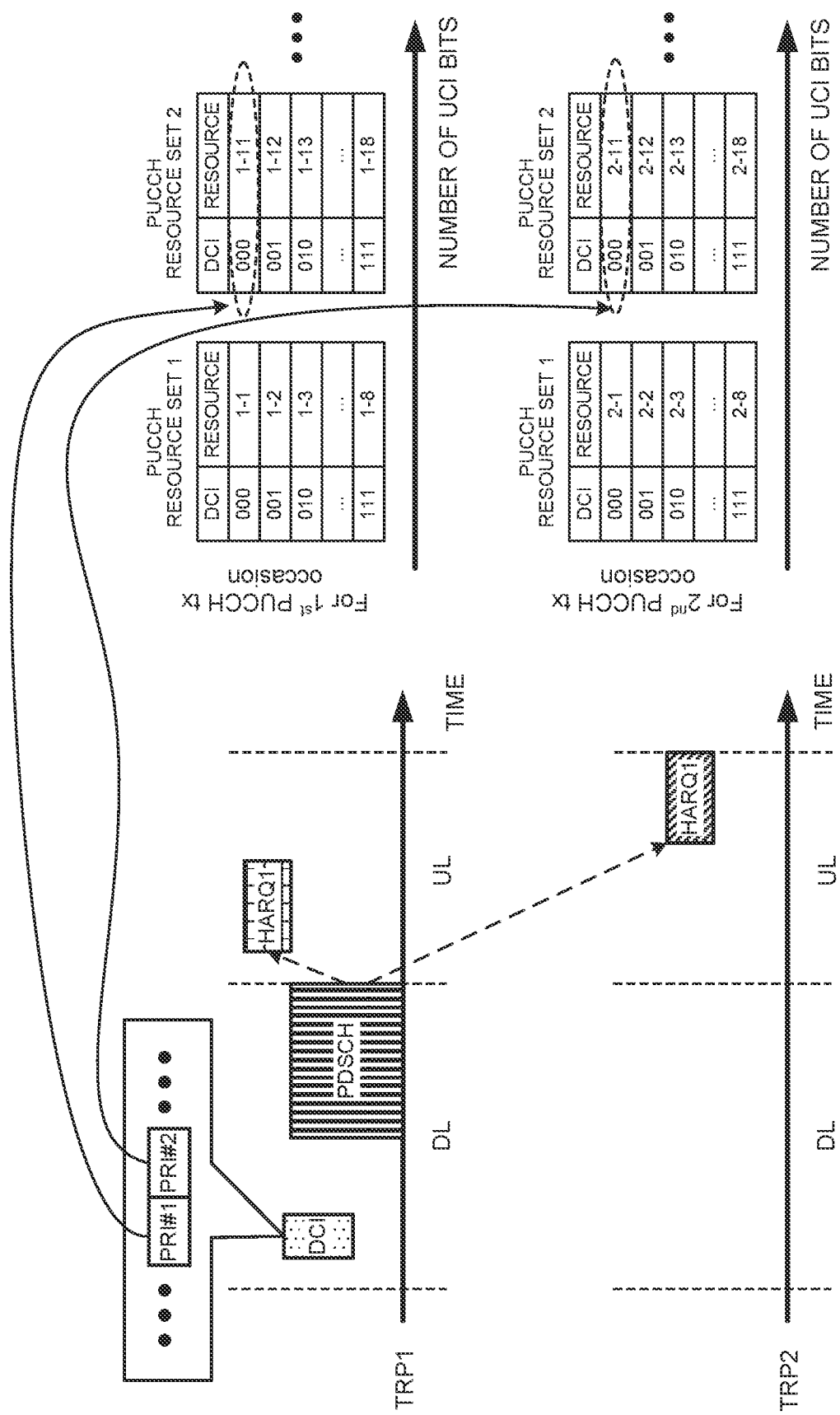
FIG. 7 is a diagram to show an example in which a PUCCH resource set group for each PUCCH transmission occasion is configured in embodiment 3.1.

FIG. 7 is a diagram to show an example in which a PUCCH resource set group for each PUCCH transmission occasion is configured in embodiment 3.1. In the present example, the PUCCH resource set group constituted by PUCCH resource sets 1, 2, . . . , is configured for the UE for each PUCH transmission occasion.

As shown in the upper right side of FIG. 7, in PUCCH resource set 1 for a first PUCCH transmission occasion, PUCCH resources 1-1 to 1-8 corresponding to DCI=000 to 111 are configured. In PUCCH resource set 2 for the first PUCCH transmission occasion, PUCCH resources 1-11 to 1-18 corresponding to DCI=000 to 111 are configured.

As shown in the lower right side of FIG. 7, in PUCCH resource set 1 for a second PUCCH transmission occasion, PUCCH resources 2-1 to 2-8 corresponding to DCI=000 to 111 are configured. In PUCCH resource set 2 for the second PUCCH transmission occasion, PUCCH resources 2-11 to 2-18 corresponding to DCI=000 to 111 are configured.

As shown in the upper left side of FIG. 7, the UE receives DCI 1 to indicate a PDSCH of TRP 1, and transmits HARQ 1 (HARQ-ACK) corresponding to the PDSCH. Here, a PUCCH resource for HARQ 1 may be specified by PRI #1 field and PRI #2 field of DCI 1. FIG. 7 shows an example in which PRI #1 field and PRI #2 field of DCI 1 are 000 and 000, respectively, a PUCCH resource for the first PUCCH transmission occasion (to which SRI for TRP 1 is applied) of the UE is resource 1-11 based on a table on the right side of FIG. 7, and a PUCCH resource for the second PUCCH transmission occasion (to which SRI for TRP 2 is applied) of the UE is resource 2-11 based on the table.

Embodiment 3.2

In embodiment 3.2, a TPC command, a PRI, and the like for a PUCCH transmission occasion for TRP #1 may be specified by using DCI for TRP #1 (for example, DCI detected in a CORESET corresponding to CORESET pool index=0). A TPC command, a PRI, and the like for a PUCCH transmission occasion for TRP #2 may be specified by using DCI for TRP #2 (for example, DCI detected in a CORESET corresponding to CORESET pool index=1).

At least one (for example, first DCI) of these DCI (multiple DCI) may be used for scheduling a PDSCH. The other DCI (for example, second DCI) not used for scheduling of the PDSCH may be used for notification of a PUCCH resource, a TPC command, and the like for a PUCCH for transmitting HARQ-ACK for the above-described PDSCH scheduled by the first DCI.

The first DCI and the second DCI may be the same DCI format (for example, DCI format 1_1), may be different DCI formats, or may have a cyclic redundancy check (CRC) scrambled by different radio network temporary identifiers (RNTIs).

Note that a PUCCH resource set common to PUCCH transmission occasions may be configured for the UE by a higher layer, or a PUCCH resource set for each PUCCH transmission occasion may be configured for the UE by the higher layer. PUCCH resource sets referred for determination of the PUCCH resource may be used for each PUCCH transmission occasion in order (by being switched to each other), or may be determined on the basis of a CORESET pool index of a CORESET in which the DCI has been detected.

Figure 8:
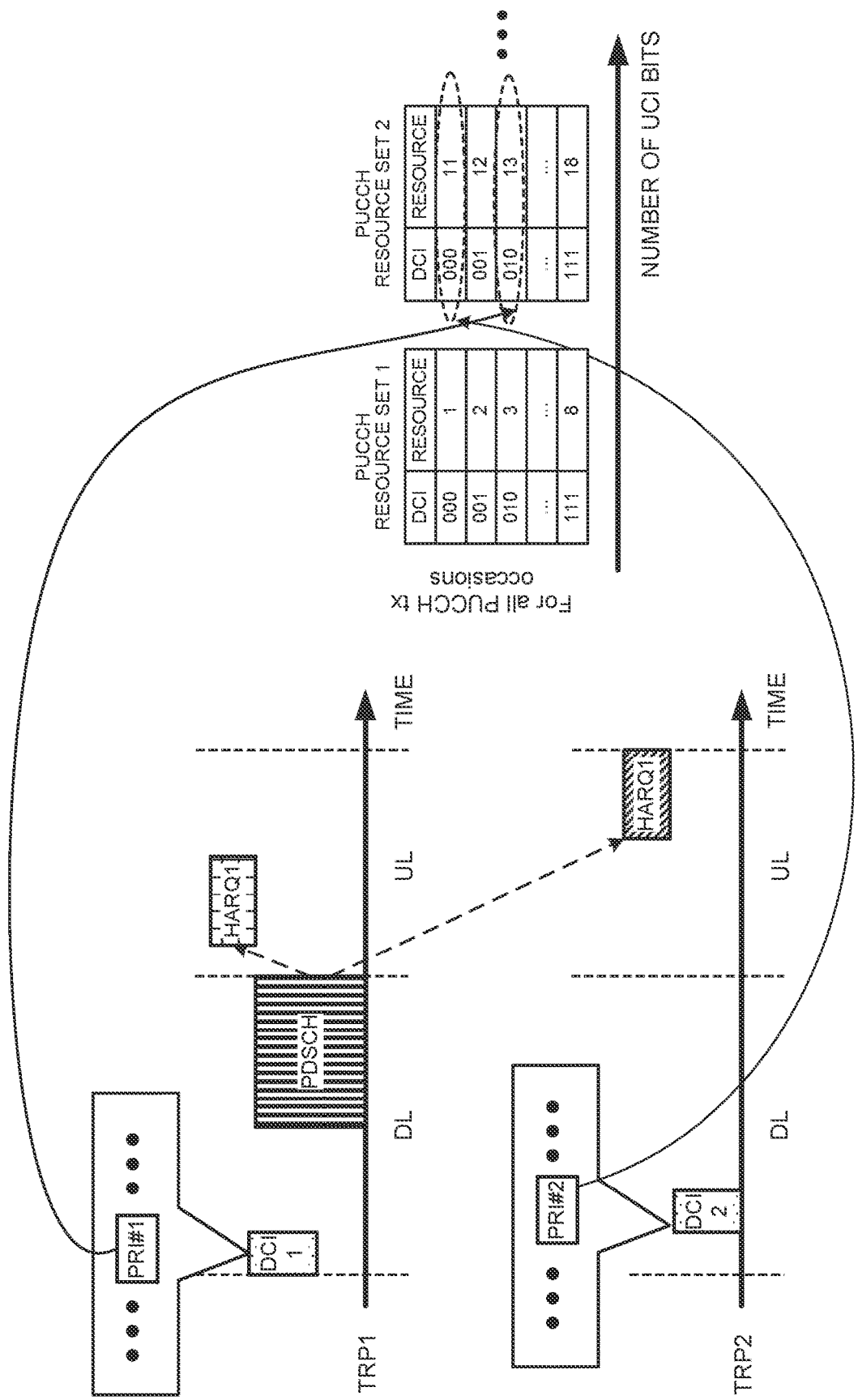
FIG. 8 is a diagram to show an example in which a PUCCH resource set group common to PUCCH transmission occasions is configured in embodiment 3.2.
Figure 9:
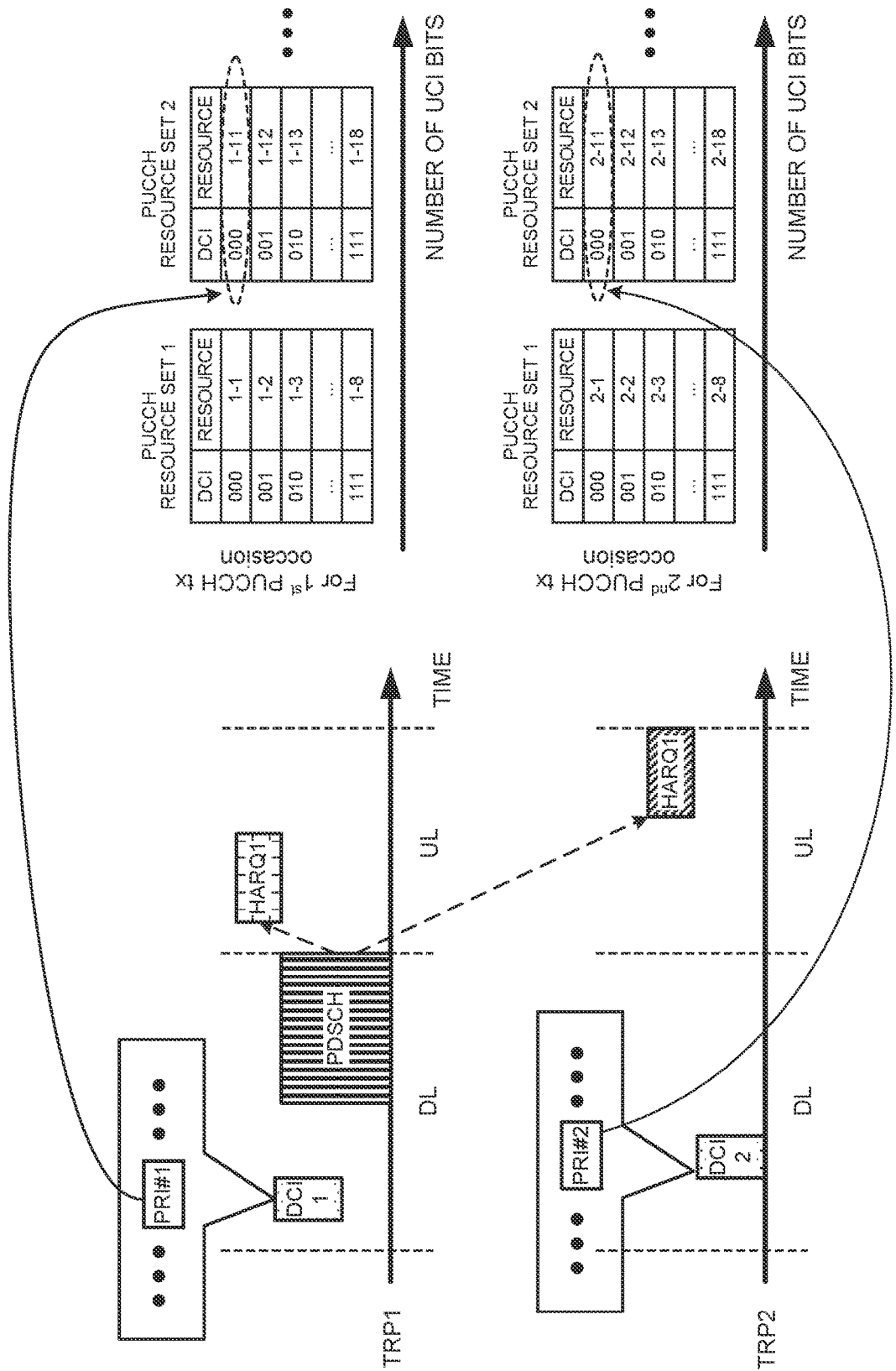
FIG. 9 is a diagram to show an example in which a PUCCH resource set group for each PUCCH transmission occasion is configured in embodiment 3.2.

FIG. 8 is a diagram to show an example in which a PUCCH resource set group common to PUCCH transmission occasions is configured in embodiment 3.2. FIG. 9 is a diagram to show an example in which a PUCCH resource set group for each PUCCH transmission occasion is configured in embodiment 3.2. FIG. 8 and FIG. 9 are similar to the example of FIG. 6 and the example of FIG. 7, respectively, but differ in terms of the following.

The UE detects DCI #1 from TRP #1 (for example, CORESET with CORESET pool index=0), and detects DCI #2 from TRP #2 (for example, CORESET with CORESET pool index=1). A PDSCH is scheduled by at least one of DCI #1 and DCI #2, PRI #1 field of DCI #1 indicates a PUCCH resource for a first PUCCH transmission occasion (to which SRI for TRP 1 is applied), and PRI #2 field of DCI #2 indicates a PUCCH resource for a second PUCCH transmission occasion (to which SRI for TRP 2 is applied).

{{DCI that does not Schedule PDSCH}}

DCI to trigger a PUCCH resource for transmitting HARQ-ACK for a PDSCH scheduled by another DCI will be described, the DCI (for example, the above-mentioned second DCI) not being used for PDSCH scheduling. Hereinafter, in the present disclosure, this DCI may also be referred to as non-scheduling DCI, PUCCH trigger-dedicated DCI, or the like.

The UE that has detected non-scheduling DCI may not, even if the non-scheduling DCI includes information to schedule a PDSCH, receive the PDSCH, and may not transmit HARQ-ACK for the PDSCH. The UE that has detected non-scheduling DCI may transmit HARQ-ACK for a PDSCH scheduled by another DCI (for example, the above-mentioned first DCI) (or an aperiodic CSI report triggered by such another DCI) by using a PUCCH resource, a TPC command, and the like specified by the non-scheduling DCI.

A field included in the non-scheduling DCI may include a HARQ process number field indicating the same HARQ process number (or HARQ process ID) as that indicated by the above-described another DCI, or may include an NDI field indicating a value of the same new data indication (New Data Indicator (NDI)) as that indicated by the above-described another DCI. The non-scheduling DCI may not include information capable of identifying scheduling (for example, a frequency domain resource allocation field, a time domain resource allocation field, or the like).

The UE may, when detected DCI satisfies at least one of the following conditions, judge that this DCI is non-scheduling DCI:

A specific field of the DCI has a certain value; and
The DCI has been detected in a specific CORESET.

This "the specific field has the certain value" may correspond to at least one of "a HARQ process number field is the same as that of another DCI" and "an NDI field is the same as that of another DCI."

The above-described specific CORESET may correspond to at least one of the same CORESET as a CORESET in which another DCI has been detected, a CORESET different from the CORESET in which another DCI has been detected, a CORESET corresponding to the same CORESET pool index as that of the CORESET in which another DCI has been detected, and a CORESET corresponding to a CORESET pool index different from that of the CORESET in which another DCI has been detected.

A period available for reception of the non-scheduling DCI may be defined. The UE may assume that DCI detected in the available reception period can be judged to be the non-scheduling DCI, and may assume that DCI other than the detected DCI cannot be judged to be the non-scheduling DCI. Thus, defining the period available for reception of the non-scheduling DCI can preferably distinguish the non-scheduling DCI from DCI for retransmission of a normal PDSCH.

The available reception period may correspond to at least one of the following:

Period from timing after receive symbol (received final symbol) for another DCI until start symbol for reception of PDSCH scheduled by such another DCI
Period from timing after receive symbol for another DCI until end symbol (final symbol) for reception of PDSCH scheduled by such another DCI
Period from timing after receive symbol for another DCI until start symbol for transmission of PUCCH triggered by such another DCI
Period from timing after receive symbol for another DCI until end symbol for transmission of PUCCH triggered by such another DCI Note that some or all of symbols in the above-described description of the available reception period may be interpreted as another time unit (for example, a slot, a subslot, a subframe, a frame, or the like). For example, the last given example may be interpreted as "period from timing after receive symbol for another DCI until end slot for transmission of PUCCH triggered by such another DCI."

Different available reception periods may be defined (different values may be used) in respective a case where the above-mentioned UCI repetition is used (the same UCI is transmitted on a PUCCH corresponding to such another DCI and a PUCCH corresponding to the non-scheduling DCI) and a case of the above-mentioned UCI encoding across multiple PUCCH resources (UCI is transmitted by being encoded across a PUCCH corresponding to such another DCI and a PUCCH corresponding to the non-scheduling DCI).

Figure 10:
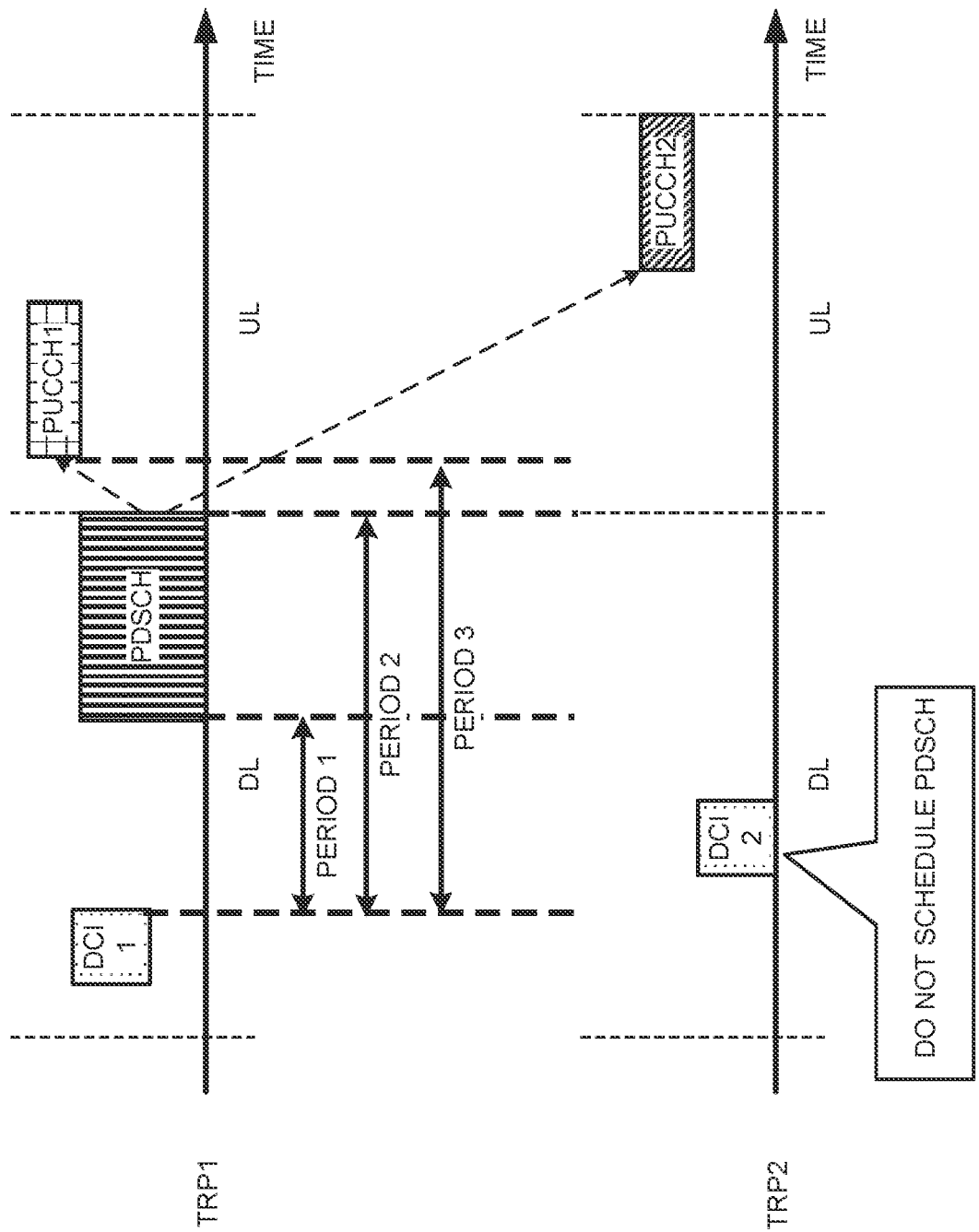
FIG. 10 is a diagram to show an example in which non-scheduling DCI is used in embodiment 3.2.

FIG. 10 is a diagram to show an example in which the non-scheduling DCI is used in embodiment 3.2. The present example is similar to FIG. 8, FIG. 9, and the like, and DCI 1 schedules a PDSCH and controls transmission of corresponding PUCCH 1. DCI 2 does not schedule a PDSCH, but transmission of PUCCH 2 to transmit UCI for the PDSCH scheduled by above-described DCI 1 is controlled by this DCI 2.

Period 1 corresponds to the above-mentioned available reception period from a timing after a receive symbol for another DCI until a start symbol for reception of a PDSCH scheduled by such another DCI.

Period 2 corresponds to the above-mentioned available reception period from a timing after a receive symbol for another DCI until an end symbol for reception of a PDSCH scheduled by such another DCI.

Period 3 corresponds to the above-mentioned available reception period from a timing after a receive symbol for another DCI until a start symbol for transmission of a PUCCH triggered by such another DCI.

The non-scheduling DCI does not schedule a PDSCH, and thus the UE may not count the non-scheduling DCI for a HARQ codebook (HARQ-ACK codebook). The HARQ codebook may be one or both of a semi-static HARQ codebook and a dynamic HARQ codebook.

For the non-scheduling DCI, a DL assignment index (Downlink Assignment Indicator (Index) (DAI)) may not be counted. The DAI may be at least one of a counter DAI (C-DAI) and a total DAI (T-DAI). The UE may ignore a DAI field of the non-scheduling DCI.

On the other hand, the DAI may be counted for the non-scheduling DCI. The UE may perform HARQ-ACK control in consideration of the DAI field of the non-scheduling DCI. In this case, an error in the non-scheduling DCI (for example, a reception error) can be grasped by the base station.

{{DCI that Schedules PDSCH}}

DCI to trigger a PUCCH resource for transmitting HARQ-ACK for a PDSCH scheduled by another DCI may be used for scheduling of the same PDSCH. The above-described DCI can be used as a backup in a case where the above-described another DCI has an error.

The above-described DCI and the above-described another DCI may have the same value of any field except a PRI field and a TPC command field.

Even when the above-described another DCI has an error, the UE can receive, on the basis of the above-described DCI, a PDSCH supposed to be scheduled by such another DCI, and can transmit HARQ-ACK corresponding to the PDSCH by using a PUCCH corresponding to the above-described DCI.

Figure 11:
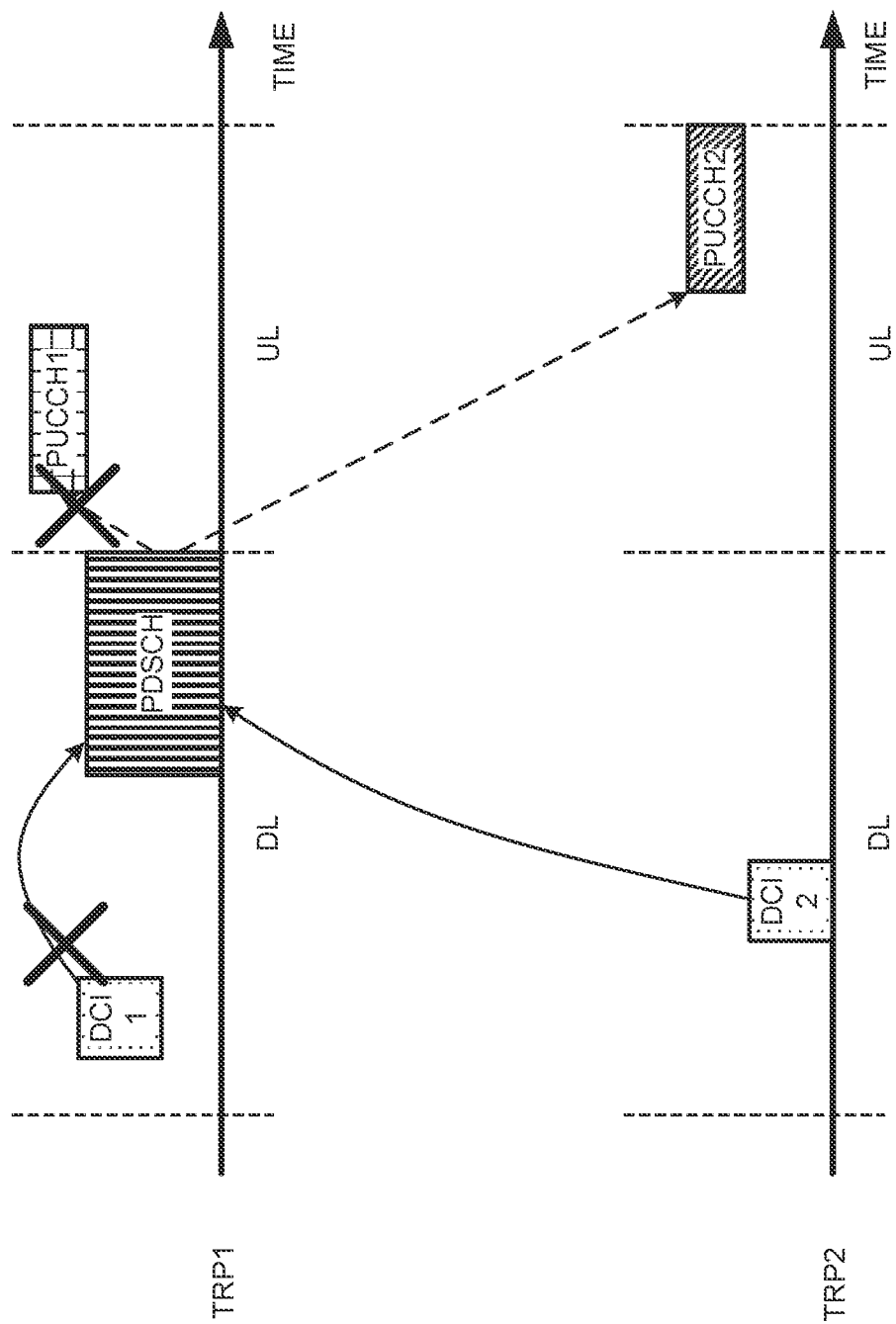
FIG. 11 is a diagram to show an example in which scheduling DCI is used in embodiment 3.2.

FIG. 11 is a diagram to show an example in which scheduling DCI is used in embodiment 3.2. The present example is similar to FIG. 8, FIG. 9, and the like, and DCI 1 schedules a PDSCH and controls transmission of corresponding PUCCH 1. DCI 2 schedules the same PDSCH, and transmission of PUCCH 2 to transmit UCI for the PDSCH scheduled by above-described DCI 1 is controlled by this DCI 2.

In the present example, the UE has failed to receive DCI 1, but has succeeded in receiving DCI 2, and thus can receive the PDSCH. The UE has failed to receive DCI 1, and thus fails to obtain information about PUCCH 1, and fails to transmit the UCI corresponding to the above-described PDSCH on PUCCH 1. On the other hand, the UE has succeeded in receiving DCI 2, and thus transmits the UCI corresponding to the above-described PDSCH on PUCCH 2.

Such control as shown in FIG. 11 in which a plurality of DCI schedule the same PDSCH may be performed in a case where a CORESET having a CORESET pool index is not configured at all for the UE or in a case where CORESET pool indexes of CORESETs in which the plurality of DCI are detected are the same, or may be performed in a case where CORESET pool indexes of CORESETs in which the plurality of DCI are detected are different from each other.

{Phase Continuity}

In the third embodiment, when a plurality of SRI are allocated to a plurality of PUCCH resources in 1 slot, at least one of the following assumptions may be performed:

For two symbols of a plurality of PUCCH resources, phases are mutually continuous (channel in continuous symbols does not vary, channel estimation result is available);

For two symbols of a plurality of PUCCH resources, phases are not mutually continuous (channel in continuous symbols may vary, channel estimation result is not available); and When two symbols of a plurality of PUCCH resources are continuous and respective SRI are the same, phases of these symbols are continuous, otherwise (for example, when the plurality of SRI are different from each other) the phases are not continuous.

According to the third embodiment described above, it is possible to appropriately perform, on the basis of multi-DCI, repetitive transmission with application of different SRI.

Fourth Embodiment

A fourth embodiment relates to a symbol gap in SRI switching.

As described in the second embodiment, the third embodiment, and the like, when a plurality of PUCCH transmission occasions for different SRI are present in the same slot, there is a possibility that an SRI (beam) switching process by a UE may take a while, and thus at least one of the following constraints may be applied:

Symbol gap is necessary between PUCCH #1 and PUCCH #2 with different SRI;

Symbol gap is necessary between symbols with different SRI in one PUCCH resource;

Symbol gap is necessary between PUCCH #1 and PUCCH #2 with different SRI, but symbol gap is unnecessary between symbols with different SRI in one PUCCH resource; and First symbol gap is necessary between PUCCH #1 and PUCCH #2 with different SRI, and second symbol gap is necessary between symbols with different SRI in one PUCCH resource (for example, first symbol gap may be greater or smaller than second symbol gap, or may be the same as second symbol gap).

Note that the above-described constraints may be constraints for each UL BWP, may be constraints for each UL carrier (or cell), or may be constraints common to a plurality of UL carriers (or cells).

The symbol gap may be used for a constraint on PUCCH resource allocation (for example, PUCCH resource allocation in the symbol gap is prohibited). A PUCCH resource overlapping with a symbol gap may be allocated for the UE, and in that case, the UE may assume that PUCCH transmission in the symbol gap is not requested (is not performed).

A value of the symbol gap may be defined by specifications beforehand, may be configured for the UE by higher layer signaling, may be specified by DCI, or may be judged on the basis of UE capability. Note that the value of the symbol gap is not limited to a positive value, and may take 0, a negative value, or the like.

Figure 12:
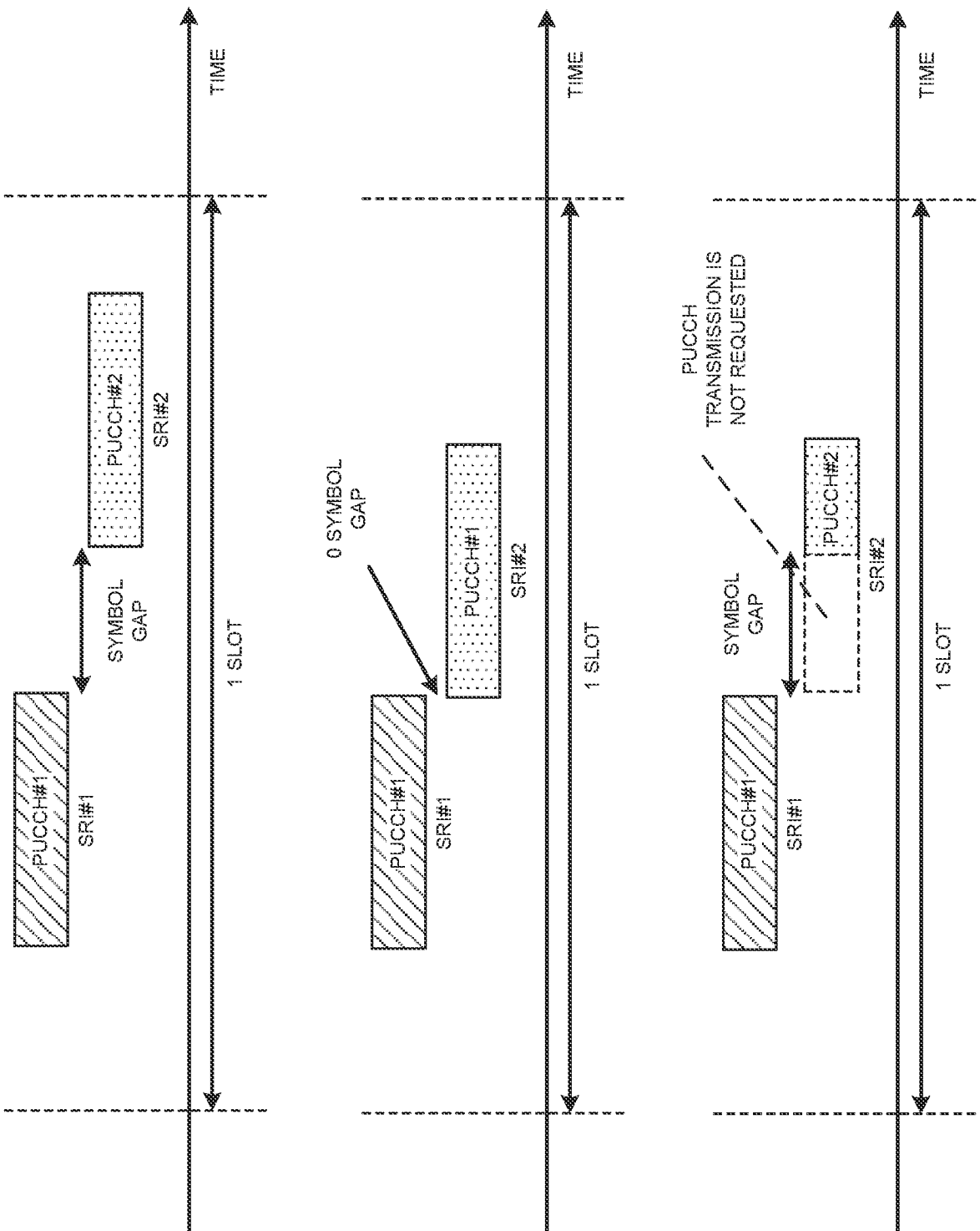
FIGS. 12A to 12C are each a diagram to show an example of a symbol gap according to a fourth embodiment.

FIGS. 12A to 12C are each a diagram to show an example of the symbol gap according to the fourth embodiment. FIG. 12A corresponds to a case where UCI is transmitted in a plurality of PUCCH resources (PUCCH #1 and PUCCH #2) in 1 slot by using a plurality of SRI (SRI #1 and SRI #2). As shown in the present example, allocation of PUCCH resources may be performed such that the symbol gap is secured between the PUCCH resources.

FIG. 12B corresponds to a case where UCI is transmitted in one PUCCH resource (PUCCH #1) in 1 slot by using a plurality of SRI (SRI #1 and SRI #2). As shown in the present example, the symbol gap may be unnecessary (the symbol gap may be 0) between symbols with different SRI in one PUCCH resource.

FIG. 12C corresponds to a case where UCI is transmitted in a plurality of PUCCH resources (PUCCH #1 and PUCCH #2) in 1 slot by using a plurality of SRI (SRI #1 and SRI #2). In the present example, a symbol of PUCCH #2 is present in a period from a final symbol of PUCCH #1 until the symbol gap. In this case, the UE may assume that PUCCH #2 in a period overlapping with the symbol gap from PUCCH #1, out of PUCCH #2, is not transmitted. Note that in a period not overlapping with the symbol gap (period after the symbol gap), the UE may transmit PUCCH #2, or may drop (or cancel) transmission of PUCCH #2.

According to the fourth embodiment described above, it is possible to perform SRI switching with appropriate consideration of a symbol gap.

Others

At least one of the above-mentioned embodiments may be employed only in a UE that has reported a specific UE capability or that supports the specific UE capability.

The specific UE capability may indicate at least one of the following:

whether to support PUCCH repetition;

whether to support intra-slot PUCCH repetition;

maximum number of SRI (or spatial relations) for each PUCCH resource to be supported; and maximum number of SRI (or spatial relations) for each slot to be supported (for PUCCH).

At least one of the above-mentioned embodiments may be employed in a case where specific information related to the above-mentioned embodiments is configured for the UE by higher layer signaling. For example, the specific information may be information indicating activation of different spatial relations for PUCCH transmission occasions, information to configure use of non-scheduling DCI, an arbitrary RRC parameter for a specific release (for example, Rel. 17), or the like.

Note that such a method of notification of a TPC command/PRI for each PUCCH transmission occasion as described in the second and third embodiments may be employed in notification of SRI for each PUCCH transmission occasion. The TPC command, PRI, and the like in the second and third embodiments may be interpreted as SRI.

In the second embodiment, for a plurality of PUCCH transmission occasions, at least one of UCI repetition and UCI encoding may be applied. In the third embodiment, for a plurality of PUCCH transmission occasions, using UCI repetition (UCI is encoded in units of PUCCH resources) is more preferable when considering an error in detection of DCI.

Note that each embodiment shows an example in which a plurality of PUCCH transmission occasions in 1 slot are controlled by using one or a plurality of DCI, but is not limited to this. For example, at least one of descriptions of the above-mentioned embodiments may be employed in a case where a plurality of PUCCH transmission occasions across multiple slots are controlled by using one or a plurality of DCI. In this case, "in slot" in the description may be interpreted as "between slots," "in a plurality of slots," or the like, or the description may be read after deleting "in slot."

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 13:
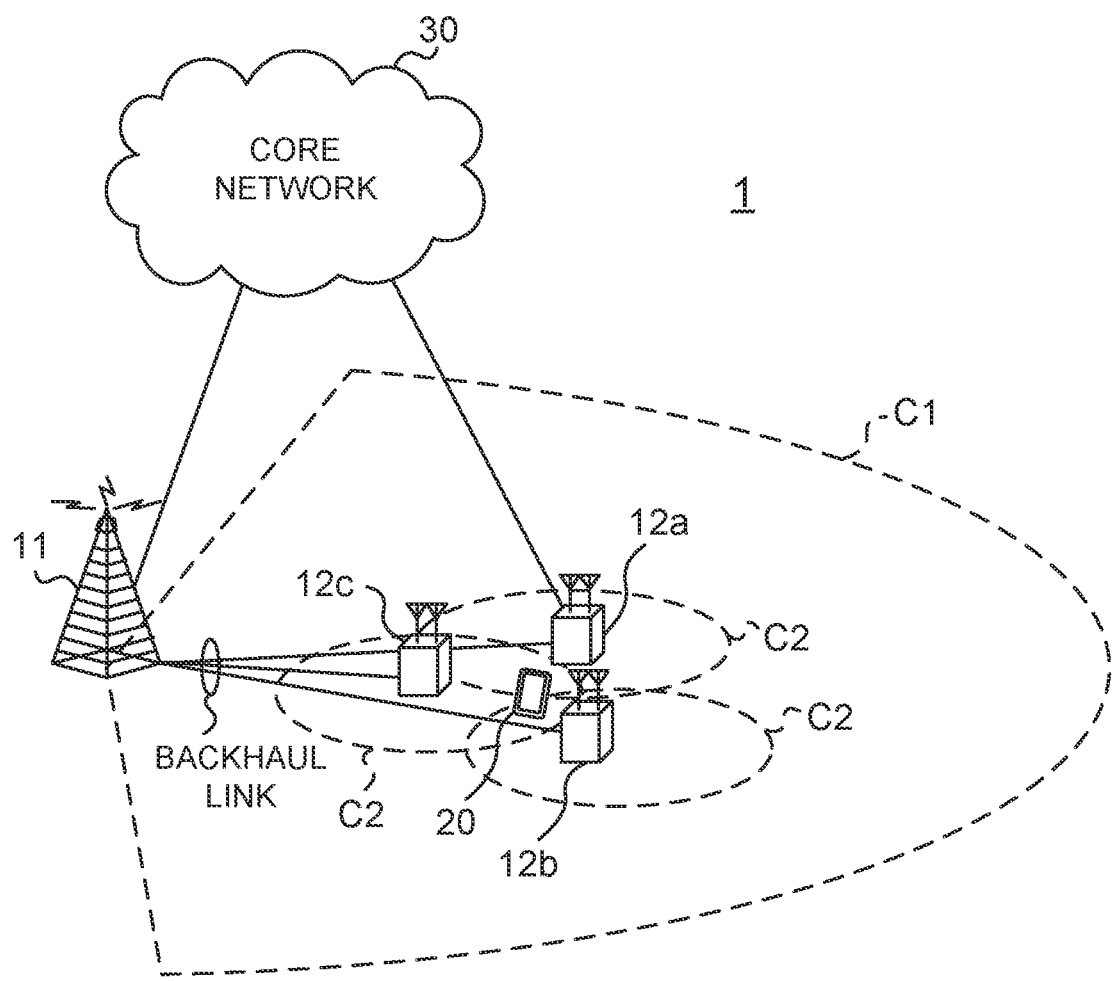
FIG. 13 is a diagram to show an example of a schematic structure of a radio communication system according to one embodiment.

FIG. 13 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a certain search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 14:
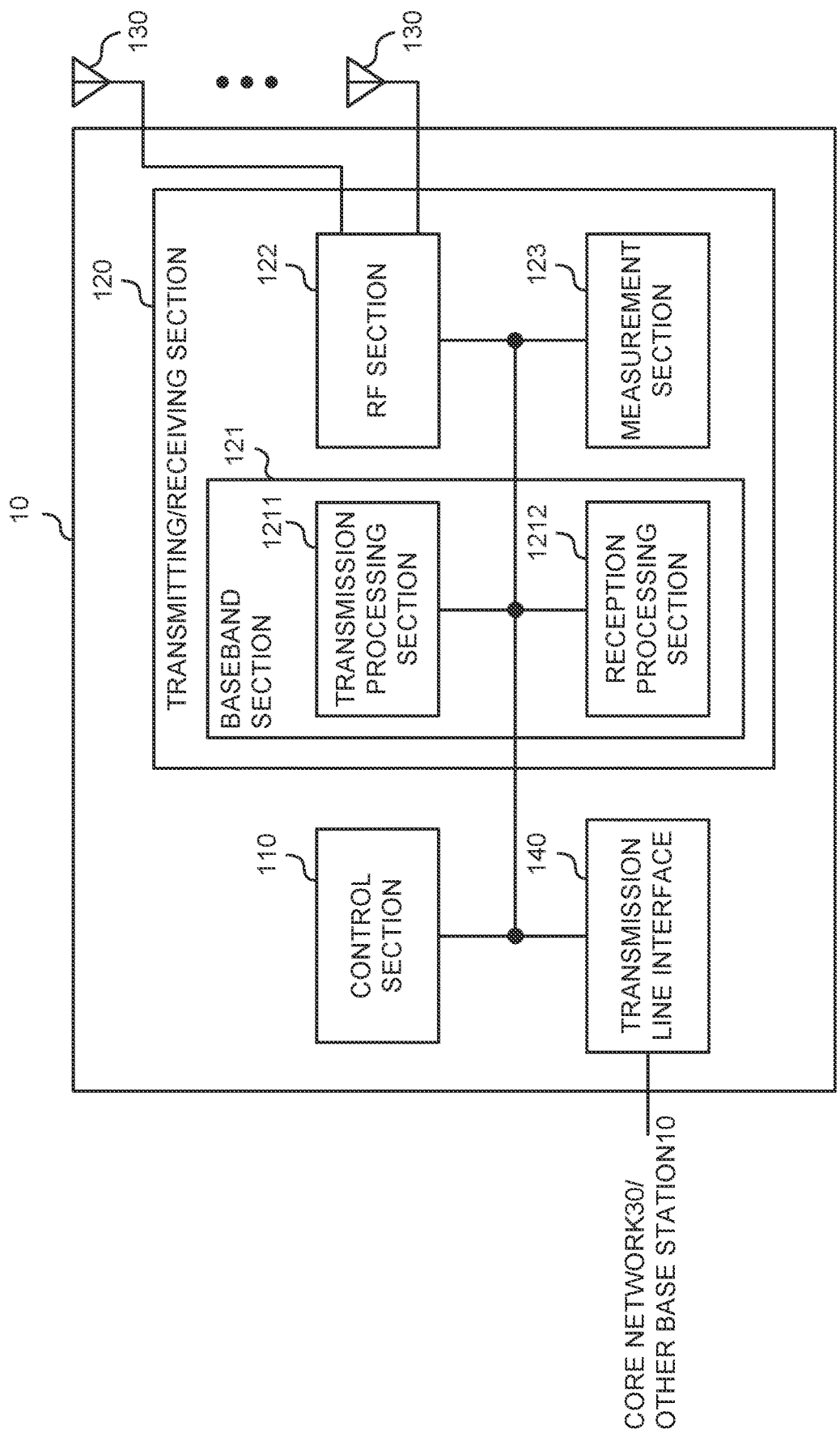
FIG. 14 is a diagram to show an example of a structure of a base station according to one embodiment.

FIG. 14 is a diagram to show an example of a structure of the base station according to one embodiment. The base station 10 includes a control section 110, a transmitting/receiving section 120, transmitting/receiving antennas 130 and a transmission line interface 140. Note that the base station 10 may include one or more control sections 110, one or more transmitting/receiving sections 120, one or more transmitting/receiving antennas 130, and one or more transmission line interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the transmission line interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The transmission line interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmission section and the receiving section of the base station 10 in the present disclosure may be constituted with at least one of the transmitting/receiving section 120, the transmitting/receiving antennas 130, and the transmission line interface 140.

Note that the transmitting/receiving section 120 may transmit information to specify a plurality of spatial relation information (SRI) related to one Physical Uplink Control Channel (PUCCH) resource.

The control section 110 may perform reception of a plurality of PUCCH transmission occasions in the PUCCH resource, the plurality of PUCCH transmission occasions being transmitted by using respective spatial domain transmission filters based on the plurality of spatial relation information.

The transmitting/receiving section 120 may transmit information to specify a plurality of spatial relation information (SRI) related to a plurality of Physical Uplink Control Channel (PUCCH) resources.

The control section 110 may perform reception of uplink control information in the plurality of PUCCH resources, the uplink control information being transmitted by using respective spatial domain transmission filters based on the plurality of spatial relation information.

(User Terminal)

Figure 15:
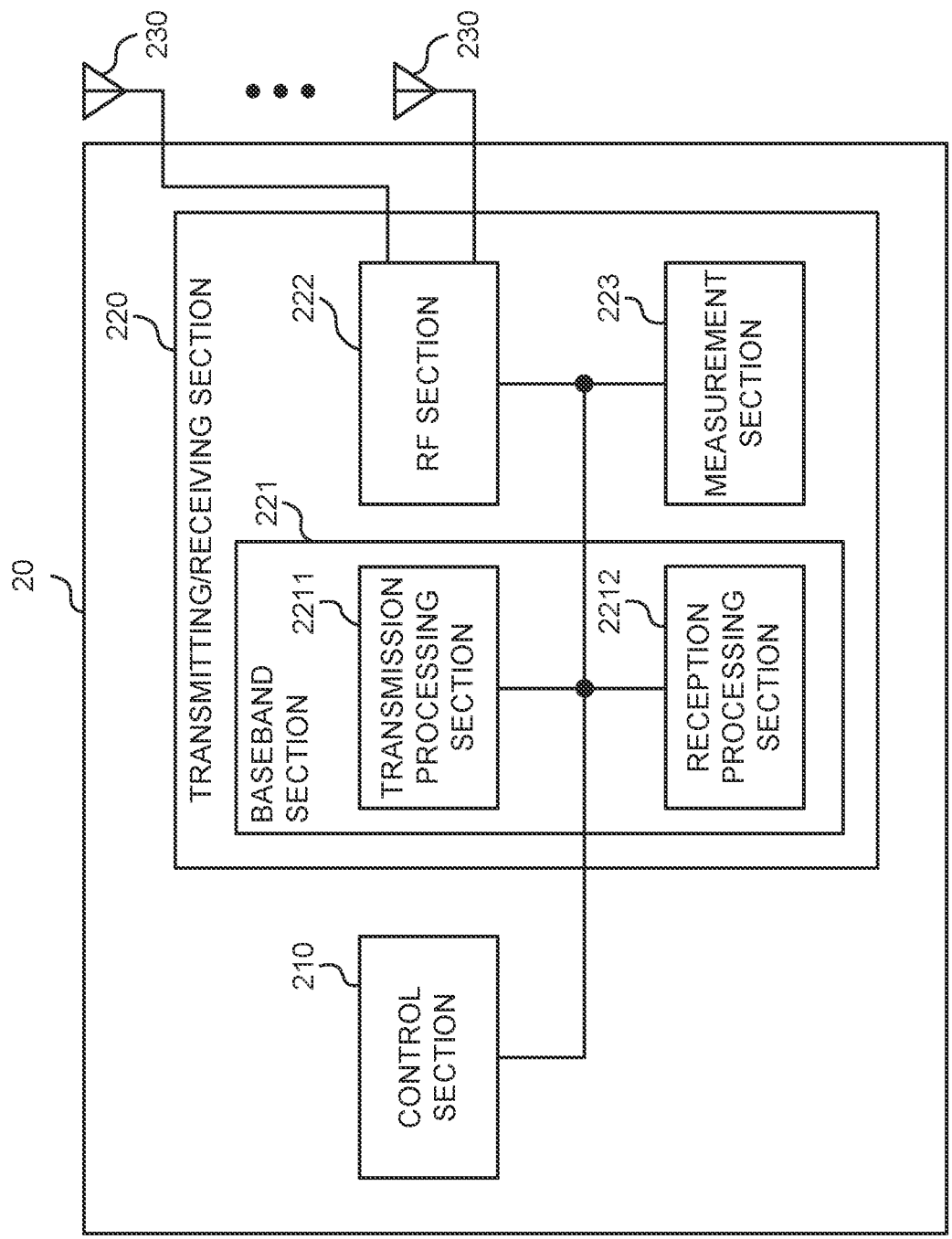
FIG. 15 is a diagram to show an example of a structure of a user terminal according to one embodiment.

FIG. 15 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211 and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/ receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a certain channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

Note that the control section 210 may apply, for one Physical Uplink Control Channel (PUCCH) resource, a plurality of spatial relation information (SRI).

The transmitting/receiving section 220 may perform transmission of a plurality of PUCCH transmission occasions in the PUCCH resource by using respective spatial domain transmission filters based on the plurality of spatial relation information.

The control section 210 may apply, for the PUCCH resource, the plurality of SRI in units of respective hops of intra-frequency hopping.

The control section 210 may apply, for the PUCCH resource, at least one the plurality of SRI to a plurality of hops of intra-frequency hopping.

The control section 210 may apply, for a plurality of Physical Uplink Control Channel (PUCCH) resources, a plurality of spatial relation information (SRI).

The transmitting/receiving section 220 may perform transmission of uplink control information in the plurality of PUCCH resources by using respective spatial domain transmission filters based on the plurality of spatial relation information.

The transmitting/receiving section 220 may transmit same uplink control information (perform UCI repetition) in the plurality of PUCCH resources.

When one of the plurality of PUCCH resources is triggered by first downlink control information, and a remaining resource of the plurality of PUCCH resources is triggered by second downlink control information, the control section 210 may assume that a downlink shared channel is not scheduled by the second downlink control information.

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 16:
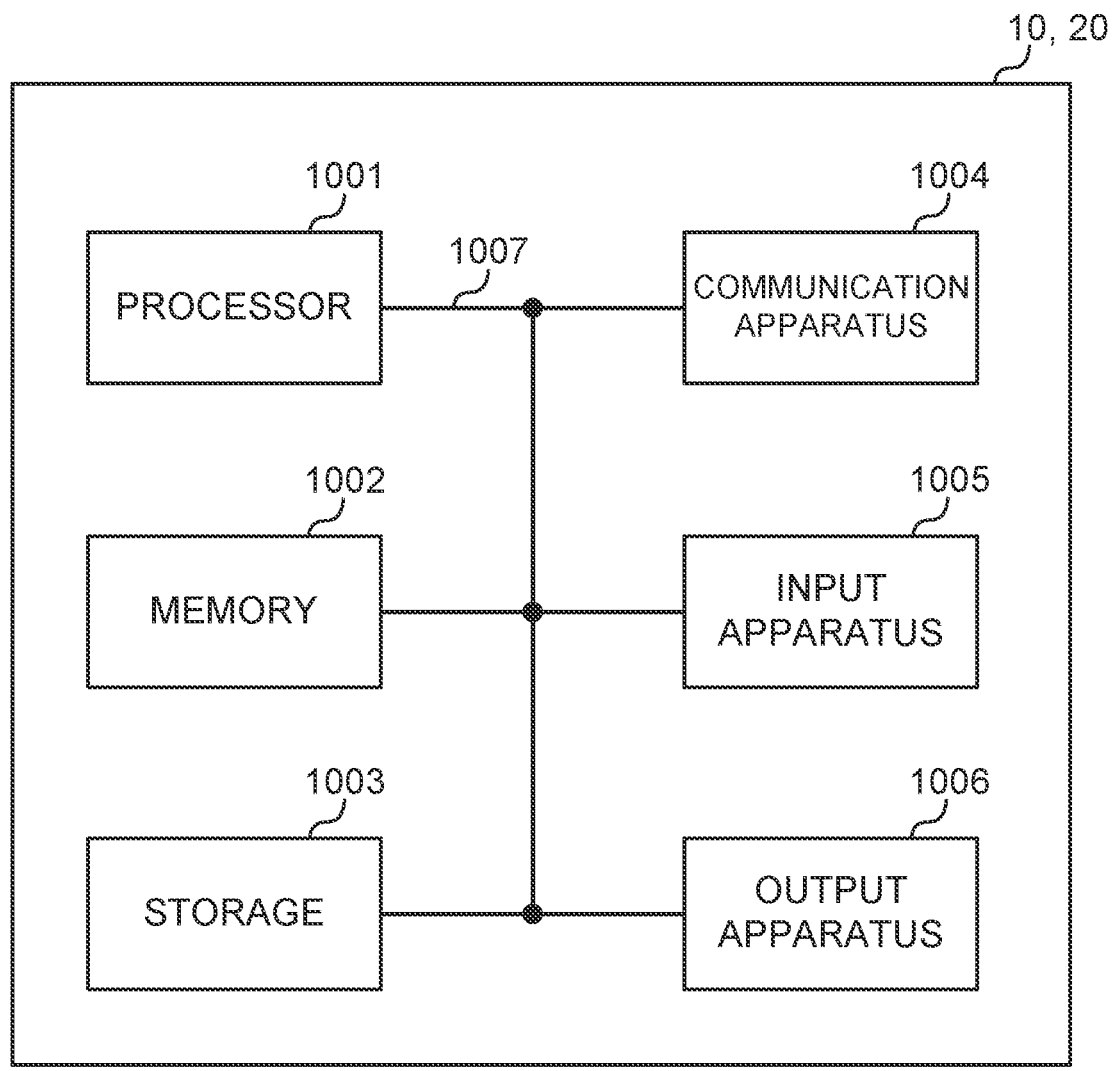
FIG. 16 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 16 is a diagram to show an example of a hardware structure of the base station and the user terminal according to one embodiment. Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120a (220a) and the receiving section 120b (220b) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

Variations

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "sub-carrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a certain channel/signal outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a moving object or a moving object itself, and so on. The moving object may be a vehicle (for example, a car, an airplane, and the like), may be a moving object which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), 6th generation mobile communication system (6G), xth generation mobile communication system (xG) (xG (where x is, for example, an integer or a decimal)), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

What is claimed is:

1. A terminal comprising:
a processor that applies multiple spatial relation information (SRI) to repetitive transmission of a physical uplink control channel (PUCCH) for multiple transmission/reception points (TRPs) in a PUCCH resource within one slot, and controls, based on a transmit power control (TPC)-related parameter configured with the multiple SRI, a transmit power of the repetitive transmission of the PUCCH; and a transmitter that performs, using respective spatial domain filters based on the multiple SRI, the repetitive transmission of the PUCCH based on the transmit power, wherein downlink control information (DCI) scheduling a physical downlink shared channel (PDSCH) includes TPC command fields for the multiple SRI, respectively, a number of the TPC command fields is equal to a number of the multiple SRI.

2. The terminal according to claim 1, wherein the processor applies frequency hopping to the PUCCH resource.

3. The terminal according to claim 1, wherein the transmitter transmits capability information indicating supporting of the repetitive transmission of the PUCCH within the one slot.

4. A radio communication method for a terminal, comprising:

applying multiple spatial relation information (SRI) to repetitive transmission of a physical uplink control channel (PUCCH) for multiple transmission/reception points (TRPs) in a PUCCH resource within one slot, and controlling, based on a transmit power control (TPC)-related parameter configured with the multiple SRI, a transmit power of the repetitive transmission of the PUCCH; and performing, using respective spatial domain filters based on the multiple SRI, the repetitive transmission of the PUCCH based on the transmit power, wherein downlink control information (DCI) scheduling a physical downlink shared channel (PDSCH) includes TPC command fields for the multiple SRI, respectively, a number of the TPC command fields is equal to a number of the multiple SRI.

5. A base station comprising:

a transmitter that transmits information indicating multiple spatial relation information (SRI) regarding repetitive transmission of a physical uplink control channel (PUCCH) for multiple transmission/reception points (TRPs) in a PUCCH resource within one slot, and transmits a transmit power control (TPC)-related parameter regarding a transmit power of the repetitive transmission of the PUCCH, the TPC-related parameter being configured with the multiple SRI; and a receiver that performs reception of the repetitive transmission of the PUCCH transmitted using the transmit power and respective spatial domain filters based on the multiple SRI, wherein downlink control information (DCI) scheduling a physical downlink shared channel (PDSCH) includes TPC command fields for the multiple SRI, respectively, a number of the TPC command fields is equal to a number of the multiple SRI.

6. A system comprising a terminal and a base station, wherein the terminal comprises:

a processor that applies multiple spatial relation information (SRI) to repetitive transmission of a physical uplink control channel (PUCCH) for multiple transmission/reception points (TRPs) in a PUCCH resource within one slot, and controls, based on a transmit power control (TPC)-related parameter configured with the multiple SRI, a transmit power of the repetitive transmission of the PUCCH; and a transmitter that performs, using respective spatial domain filters based on the multiple SRI, the repetitive transmission of the PUCCH based on the transmit power, wherein downlink control information (DCI) scheduling a physical downlink shared channel (PDSCH) includes TPC command fields for the multiple SRI respectively, a number of the TPC command fields is equal to a number of the multiple SRI, and the base station comprises:

a transmitter that transmits the information indicating the multiple SRI and transmits the TPC-related parameter; and a receiver that performs reception of the repetitive transmission of the PUCCH transmitted using the transmit power and the respective spatial domain filters.

* * * * *